United States Patent
Dor et al.

(10) Patent No.: US 12,032,830 B2
(45) Date of Patent: Jul. 9, 2024

(54) HOST PATH SELECTION UTILIZING ADDRESS RANGE DISTRIBUTION OBTAINED FROM STORAGE NODES FOR DISTRIBUTED LOGICAL VOLUME

(71) Applicant: Dell Products L.P., Round Rock, TX (US)

(72) Inventors: Ziv Dor, Rishon Letzion (IL); Itay Keller, Tel Aviv (IL); Rivka Mayraz Matosevich, Zichron Ya'acov (IL); Tal Abir, Nesher (IL)

(73) Assignee: Dell Products L.P., Round Rock, TX (US)

( * ) Notice: Subject to any disclaimer, the term of this patent is extended or adjusted under 35 U.S.C. 154(b) by 169 days.

(21) Appl. No.: 17/730,288

(22) Filed: Apr. 27, 2022

(65) Prior Publication Data
US 2023/0350572 A1    Nov. 2, 2023

(51) Int. Cl.
*G06F 3/06* (2006.01)
(52) U.S. Cl.
CPC .......... *G06F 3/0613* (2013.01); *G06F 3/0659* (2013.01); *G06F 3/0665* (2013.01); *G06F 3/067* (2013.01); *G06F 3/0683* (2013.01)
(58) Field of Classification Search
CPC .... G06F 3/0613; G06F 3/0659; G06F 3/0665; G06F 3/067; G06F 3/0683
See application file for complete search history.

(56) References Cited

U.S. PATENT DOCUMENTS

| | | | |
|---|---|---|---|
| 10,310,760 | B1 | 6/2019 | Dreier et al. |
| 10,893,105 | B1* | 1/2021 | Bono ................ H04L 67/1097 |
| 11,507,283 | B1* | 11/2022 | Olson ................ G06F 16/909 |
| 2003/0149773 | A1 | 8/2003 | Harbin et al. |
| 2009/0154472 | A1 | 6/2009 | Chung et al. |
| 2013/0198312 | A1 | 8/2013 | Tamir et al. |

(Continued)

OTHER PUBLICATIONS

U.S. Appl. No. 17/578,609 filed in the name of Xiangping Chen et al. filed Jan. 19, 2022, and entitled "Intelligent Target Routing in a Distributed Storage System."

(Continued)

*Primary Examiner* — Eric Cardwell
(74) *Attorney, Agent, or Firm* — Ryan, Mason & Lewis, LLP

(57) ABSTRACT

An apparatus includes at least one processing device configured to identify a logical storage volume stored across multiple storage nodes of a distributed storage system, to obtain address range distribution information for the logical storage volume from at least a subset of the storage nodes, the address range distribution information indicating, for each of a plurality of distinct address ranges of the logical storage volume, which of the storage nodes locally stores data for that address range, and to generate, from the obtained address range distribution information, a mapping of the distinct address ranges to particular ones of the storage nodes, wherein the mapping is utilized to select paths for delivery of input-output operations to the storage nodes. Obtaining address range distribution information for the logical storage volume may comprise, for example, sending log page commands to each of the storage nodes to obtain asymmetric range access and/or template information.

20 Claims, 9 Drawing Sheets

ASYMMETRIC RANGE ACCESS (ARA) LOG PAGE INFORMATION

| Part | Definition | Value in the example |
|---|---|---|
| ARA Page Header | Provide important information about the page, including total size | |
| Range #1 | Address range size (a power of 2) | 33 (indicating 2^33=8GiB) |
| | Template ID | 0x0A |
| | Access Modifier | 1 |
| Range #2 | Address range size (a power of 2) | 33 (indicating 2^33=8GiB) |
| | Template ID | 0x08 |
| | Access Modifier | 0 |

(56) References Cited

U.S. PATENT DOCUMENTS

| | | | |
|---|---|---|---|
| 2013/0226887 A1 | 8/2013 | Braam et al. | |
| 2014/0123316 A1* | 5/2014 | Leggette | H04L 67/1097 726/28 |
| 2014/0222873 A1* | 8/2014 | Nakadai | G06F 16/2282 707/803 |
| 2015/0012607 A1 | 1/2015 | Cayton et al. | |
| 2017/0177222 A1 | 6/2017 | Singh et al. | |
| 2020/0019521 A1 | 1/2020 | Solanki et al. | |
| 2020/0026606 A1 | 1/2020 | Farnum et al. | |

OTHER PUBLICATIONS

Storpool Storage, "Demystifying: What is NVMeOF?" https://storpool.com/blog/demystifying-what-is-nvmeof, Sep. 12, 2017, 4 pages.

Vmware, "VMware ESX Server," Product Datasheet, 2007, 4 pages.

Wikipedia, "Host Adapter," https://en.wikipedia.org/wiki/Host_adapter, Jul. 19, 2021, 4 pages.

Wikipedia, "iSCSI," https://en.wikipedia.org/wiki/ISCSI, Dec. 22, 2021, 10 pages.

Wikipedia, "NVM Express," https://en.wikipedia.org/wiki/NVM_Express, Jan. 13, 2022, 18 pages.

A. S. Gillis, "NVMe Over Fabrics (NVMe-oF)," https://searchstorage.techtarget.com/definition/NVMe-over-Fabrics-Nonvolatile-Memory-Express-over-Fabrics?vgnextfmt=print, Jan. 15, 2020, 5 pages.

Wikipedia, "Remote Direct Memory Access," https://en.wikipedia.org/wiki/Remote_direct_memory_access, Jan. 30, 2021, 3 pages.

M. Hoyt, "ScaleIO Tech Overview and Concepts: SDS-SAN vs SDS-Array," https://www.thinkahead.com/TheLAB/scaleio-tech-verview-concepts-sds-san-vs-sds-array/, Apr. 5, 2017, 16 pages.

EMC Corporation, "EMC ScaleIO Architectural and Functional Overview," EMC White Paper, Dec. 2013, 13 pages.

Dell EMC, "Dell EMC VxFlex OS: Networking Best Practices and Design Considerations," Dell EMC White Paper, Jul. 2018, 38 pages.

R. Kerns, "What is Block I/O?" searchstorage.techtarget.com/answer/What-is-block-I-O, Oct. 19, 2005, 2 pages.

Janalta Interactive, "Client-Side" https://www.techopedia.com/definition/439/client-side, Accessed Jan. 14, 2022, 8 pages.

EMC Corporation, "EMC ScaleIO Design Considerations and Best Practices," EMC White Paper, Jun. 2016, 30 pages.

Mellanox Technologies, "Roce vs. iWARP Competitive Analysis," White Paper, Feb. 2017, 6 pages.

NVM Express, "NVM Express Base Specification, Revision 2.0a," NVM Express, Jul. 23, 2021, 454 pages.

S. Peterson, "Adaptive Distributed NVMe over Fabric Namespaces (ADNN)" Storage Developer Conference, https://www.youtube.com/watch?v=3UfJhVcQnDk&t=1244s, Sep. 22-23, 2020, Video.

S. Sen et al., "Delivering Block Storage using NVMe-over-Fabric," Storage Developer Conference, https://www.youtube.com/watch?v=KbgudQ14884, Sep. 24-27, 2018, Video.

S. Sen et al., "Intel RSD and NVMe-over-Fabric," Intel, Flash Memory Summit, Aug. 11, 2017, 23 pages.

U.S. Appl. No. 17/326,452 filed in the name of Sanjib Mallick et al. filed May 21, 2021, and entitled "Write Pressure Throttling Based on Service Level Objectives."

U.S. Appl. No. 17/361,666 filed in the name of Xiangping Chen et al. filed Jan. 19, 2022, and entitled "Intelligent Target Routing in a Distributed Storage System."

U.S. Appl. No. 17/696,360 filed in the name of Sanjib Mallick et al. filed Mar. 16, 2022, and entitled "Intelligent Path Selection in a Distributed Storage System."

U.S. Appl. No. 17/714,312 filed in the name of Igor Achkinazi et al. filed Apr. 6, 2022, and entitled "Storage System with Multiple Target Controllers Supporting Different Service Level Objectives."

U.S. Appl. No. 17/716,118 filed in the name of Igor Achkinazi et al. filed Apr. 8, 2022, and entitled "Host-Based Locality Determination for Logical Volumes Stored Across Multiple Nodes of a Distributed Storage System."

* cited by examiner

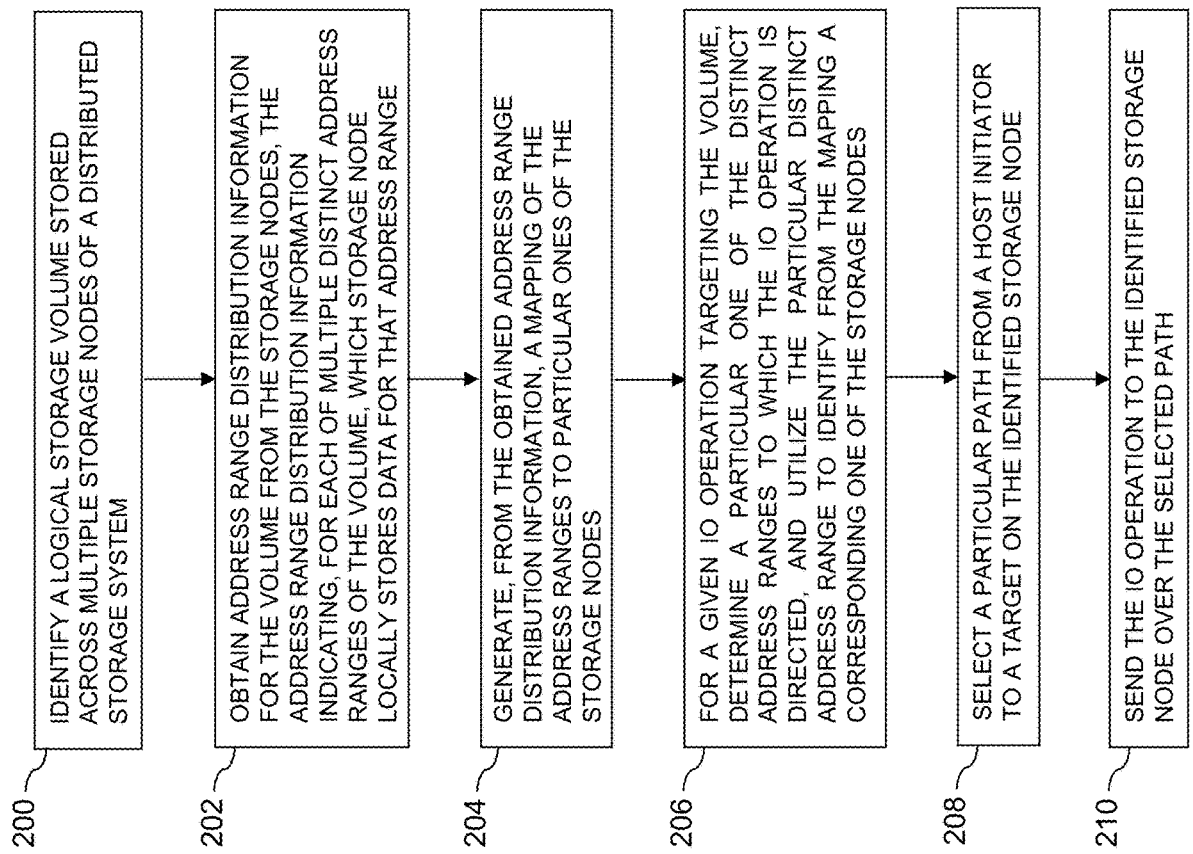

ASYMMETRIC RANGE ACCESS (ARA) LOG PAGE INFORMATION

| Part | | Definition | Value in the example |
|---|---|---|---|
| ARA Page Header | | Provide important information about the page, including total size | |
| Range #1 | Address range size (a power of 2) | | 33 (indicating 2^33=8GiB) |
| | Template ID | | 0x0A |
| | Access Modifier | | 1 |
| Range #2 | Address range size (a power of 2) | | 33 (indicating 2^33=8GiB) |
| | Template ID | | 0x0B |
| | Access Modifier | | 0 |

FIG. 3C

TEMPLATE LOG PAGE INFORMATION

| Part | Definition | Value in the example |
|---|---|---|
| Template Generic Header | Template size | Size required for the encoding |
| | Template type | Modulus |
| Modulus encoding header | Resolution type (Path / Template) | Path |
| | Modulus data granularity (must be at least Mapping granularity) | 20 (indicating 2^20=1MiB) |
| | Modulus value (repetition pattern) | 22 (indicating 2^22 = 4MiB) |
| Access range 0 | Number of optimal paths in range | 1 |
| | Path #1 | Path to node 1 |
| Access range 1 | Number of optimal paths in range | 1 |
| | Path #1 | Path to node 2 |
| Access range 2 | Number of optimal paths in range | 1 |
| | Path #1 | Path to node 3 |
| Access range 3 | Number of optimal paths in range | 2 |
| | Path #1 | Path to node 1 |
| | Path #2 | Path to node 3 |

FIG. 3D

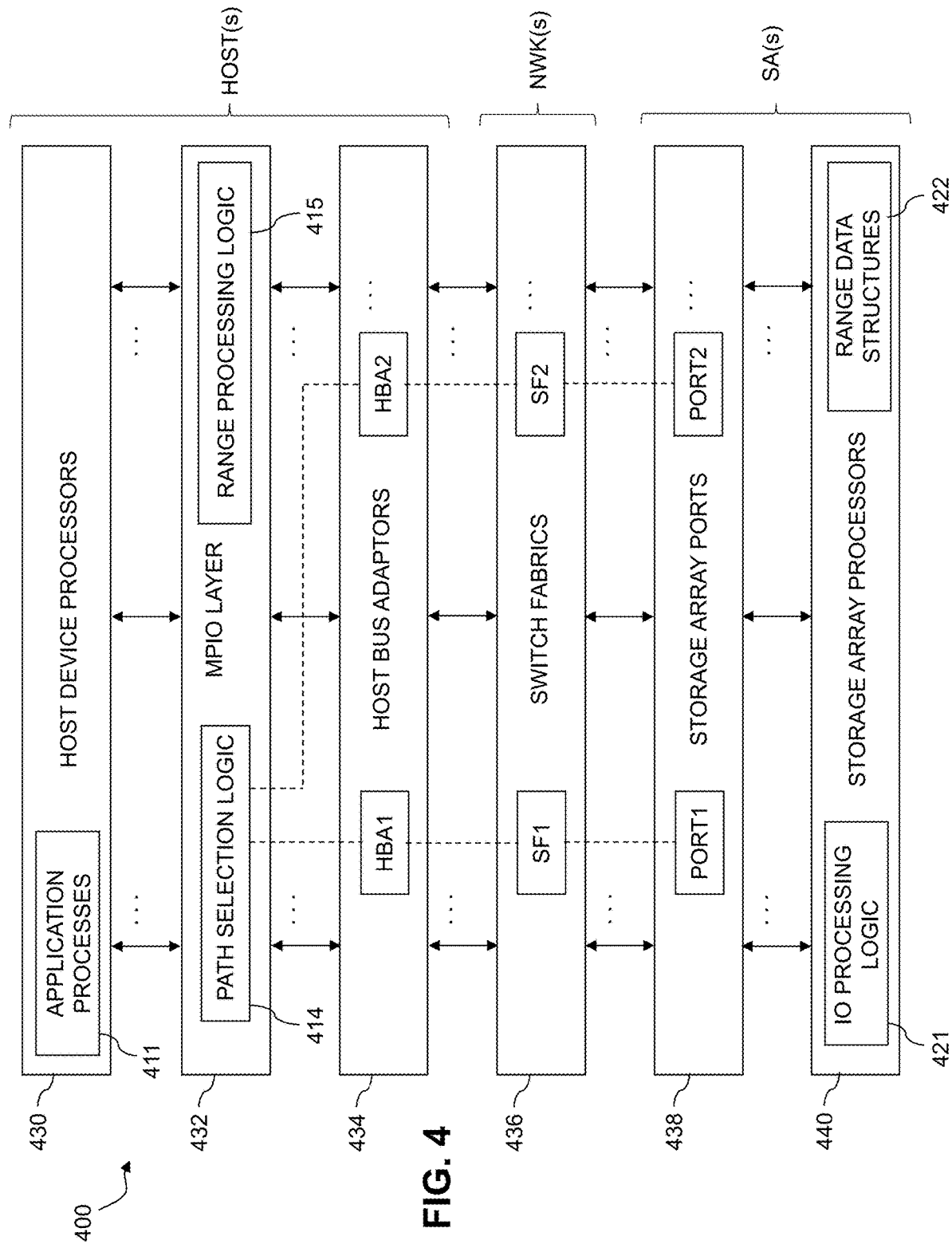

HOST PATH SELECTION UTILIZING ADDRESS RANGE DISTRIBUTION OBTAINED FROM STORAGE NODES FOR DISTRIBUTED LOGICAL VOLUME

FIELD

The field relates generally to information processing systems, and more particularly to storage in information processing systems.

BACKGROUND

Information processing systems often include distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. Data within the system is partitioned, striped, and replicated across the distributed storage nodes. For a storage administrator, the software-defined storage system provides a logical view of a given dynamic storage pool that can be expanded or contracted at ease, with simplicity, flexibility, and different performance characteristics. For applications running on a host device that utilizes the software-defined storage system, such a storage system provides a logical storage object view to allow a given application to store and access data, without the application being aware that the data is being dynamically distributed among different storage nodes potentially at different sites. In these and other software-defined storage system arrangements, it can be difficult to perform path selection using advanced storage access protocols such as Non-Volatile Memory Express (NVMe) over Fabrics, also referred to as NVMe/oF, or NVMe over Transmission Control Protocol (TCP), also referred to as NVMe/TCP. For example, some software-defined storage systems utilize proprietary protocols to enable seamless access to data located in different storage nodes on behalf of the applications, and to hide the details of data distribution and physical storage locations from the applications and possibly also from other portions of the host device. In such arrangements, it is possible that non-optimal paths to the software-defined storage system may be selected under various conditions, potentially leading to performance issues such as excessive latency and reduced throughput.

SUMMARY

Illustrative embodiments disclosed herein provide techniques for host path selection utilizing address range distribution information obtained for one or more distributed logical storage volumes from multiple storage nodes in a software-defined storage system or other type of distributed storage system.

Such techniques can advantageously facilitate the usage of advanced storage access protocols such as NVMe/oF or NVMe/TCP while avoiding the above-described drawbacks of conventional practice. For example, some embodiments can provide reduced latency and higher throughput performance relative to conventional systems by configuring one or more host devices to make path selection decisions in a manner that takes into account the distribution of the data of a given logical storage volume across the storage nodes. Such path selection illustratively utilizes the obtained address range distribution information to select for each of one or more input-output (IO) operations a path to the particular storage node that locally stores the data targeted by that IO operation, thereby reducing or eliminating the need for additional network hops between storage nodes to access the targeted data. Such a selected path is an example of what is broadly referred to herein as an "optimal path" for the IO operation.

Although some embodiments are described herein in the context of implementing an NVMe/oF or NVMe/TCP storage access protocol in a software-defined storage system, it is to be appreciated that other embodiments can be implemented in other types of distributed storage systems using other storage access protocols. Accordingly, all references herein to software-defined storage systems are made by way of illustrative example only, and should not be construed as limiting in any way.

In one embodiment, an apparatus comprises at least one processing device that includes a processor coupled to a memory. The at least one processing device is configured to identify a logical storage volume stored across multiple storage nodes of a distributed storage system, to obtain address range distribution information for the logical storage volume from at least a subset of the storage nodes, wherein the address range distribution information indicates, for each of a plurality of distinct address ranges of the logical storage volume, which of the storage nodes locally stores data for that address range, and to generate, from the obtained address range distribution information, a mapping of the distinct address ranges to particular ones of the storage nodes. The mapping is utilized to select paths for delivery of IO operations to the storage nodes.

The at least one processing device illustratively comprises at least a portion of a host device which communicates with the distributed storage system over one or more networks, such as a multi-path driver of the host device. The host device illustratively comprises a plurality of initiators and supports one or more paths between each of the initiators and one or more targets on respective ones of the storage nodes.

Obtaining address range distribution information for the logical storage volume from at least a subset of the storage nodes may comprise, for example, sending one or more log page commands and/or other types of commands to each of the storage nodes. Such commands can be used in some embodiments to obtain from a given one of the storage nodes at least one of asymmetric range access information and template information for the logical storage volume.

In some embodiments, the at least one processing device is further configured, for each of a plurality of IO operations targeting the logical storage volume, to determine a particular one of the distinct address ranges to which the IO operation is directed, to utilize the particular distinct address range to identify from the stored mapping a corresponding one of the storage nodes, to select a path to the identified storage node, and to send the IO operation to the identified storage node over the selected path.

The distributed storage system illustratively comprises, for example, a software-defined storage system and the storage nodes illustratively comprise respective software-defined storage server nodes of the software-defined storage system. Numerous other types of distributed storage systems can be used in other embodiments.

BRIEF DESCRIPTION OF THE DRAWINGS

FIG. 2 is a flow diagram of a process for obtaining address range distribution information and performing associated path selection for logical storage volumes of a distributed storage system in an illustrative embodiment.

FIGS. 3C and 3D show respective example asymmetric range access information and template information of the obtained address range distribution information in such an embodiment. These figures are collectively referred to herein as FIG. 3.

FIG. 4 shows another example of an information processing system incorporating functionality for obtaining address range distribution information and performing associated path selection in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
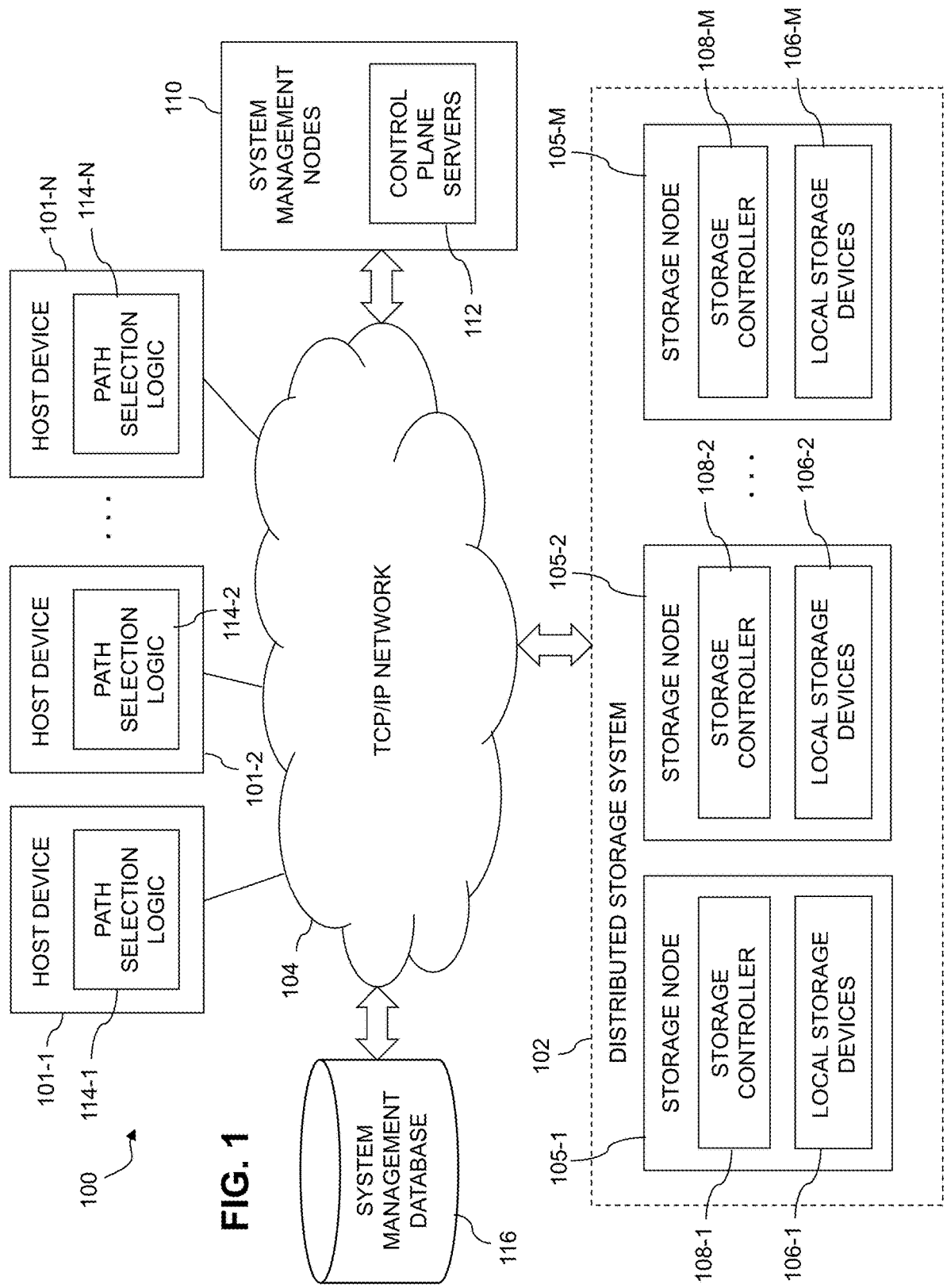
FIG. 1 is a block diagram of an information processing system incorporating functionality for obtaining address range distribution information and performing associated path selection for logical storage volumes of a distributed storage system in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a distributed storage system 102 shared by the host devices 101. The host devices 101 and distributed storage system 102 in this embodiment are configured to communicate with one another via a network 104 that illustratively utilizes protocols such as Transmission Control Protocol (TCP) and/or Internet Protocol (IP), and is therefore referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

The distributed storage system 102 more particularly comprises a plurality of storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is just one possible example of what is generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space. For a given logical storage volume, logical blocks of that logical storage volume are illustratively distributed across the storage nodes 105.

Other types of distributed storage systems can be used in other embodiments. For example, distributed storage system 102 can comprise multiple distinct storage arrays, such as a production storage array and a backup storage array, possibly deployed at different locations. Accordingly, in some embodiments, one or more of the storage nodes 105 may each be viewed as comprising at least a portion of a separate storage array with its own logical address space. Alternatively, the storage nodes 105 can be viewed as collectively comprising one or more storage arrays. The term "storage node" as used herein is therefore intended to be broadly construed.

In some embodiments, the distributed storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments. Examples of such software-defined storage systems will be described in more detail below in conjunction with FIG. 3A. Again, all references herein to software-defined storage systems are made by way of illustrative example only, and should not be construed as limiting in any way. A wide variety of other types of distributed storage systems comprising multiple storage nodes can be used.

Each of the storage nodes 105 is illustratively configured to interact with one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices 101. Such applications illustratively generate input-output (TO) operations that are processed by a corresponding one of the storage nodes 105. The term "input-output" as used herein refers to at least one of input and output. For example, TO operations may comprise write requests and/or read requests directed to logical addresses of a particular logical storage volume of one or more of the storage nodes 105. These and other types of TO operations are also generally referred to herein as TO requests.

The TO operations that are currently being processed in the distributed storage system 102 in some embodiments are referred to herein as "in-flight" IOs that have been admitted by the storage nodes 105 to further processing within the system 100. The storage nodes 105 are illustratively configured to queue TO operations arriving from one or more of the host devices 101 in one or more sets of TO queues.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms.

The host devices 101 are illustratively configured to write data to and read data from the distributed storage system 102 comprising storage nodes 105 in accordance with applications executing on those host devices 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand or Gigabit Ethernet, in addition to or in place of FC. Numerous alternative networking arrangements are possible in a given embodiment, as will be appreciated by those skilled in the art. Other examples include remote direct memory access (RDMA) over Converged Ethernet (ROCE) or InfiniBand over Ethernet (IBoE).

The first storage node 105-1 comprises a plurality of storage devices 106-1 and an associated storage controller 108-1. The storage devices 106-1 illustratively store metadata pages and user data pages associated with one or more storage volumes of the distributed storage system 102. The storage volumes illustratively comprise respective logical units (LUNs) or other types of logical storage volumes. The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-2 comprises a plurality of storage devices 106-2 and an associated storage controller 108-2, and storage node 105-M comprises a plurality of storage devices 106-M and an associated storage controller 108-M.

As indicated previously, the storage devices 106-2 through 106-M illustratively store metadata pages and user data pages associated with one or more storage volumes of the distributed storage system 102, such as the above-noted LUNs or other types of logical storage volumes. The storage devices 106-2 more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node. It is assumed that such local persistent storage devices of the given storage node are accessible to the storage controller of that node via a local interface, and are accessible to storage controllers 108 of respective other ones of the storage nodes 105 via remote interfaces. For example, it is assumed in some embodiments disclosed herein that each of the storage devices 106 on a given one of the storage nodes 105 can be accessed by the given storage node via its local interface, or by any of the other storage nodes 105 via an RDMA interface. A given storage application executing on the storage nodes 105 illustratively requires that all of the storage nodes 105 be able to access all of the storage devices 106. Such access to local persistent storage of each node from the other storage nodes can be performed, for example, using the RDMA interfaces with the other storage nodes, although numerous other arrangements are possible.

The storage controllers 108 of the storage nodes 105 may include additional modules and other components typically found in conventional implementations of storage controllers and storage systems, although such additional modules and other components are omitted from the figure for clarity and simplicity of illustration.

For example, the storage controllers 108 can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 105 of the distributed storage system of FIG. 1.

In some embodiments, the storage nodes 105 of the distributed storage system collectively provide a scale-out storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 105 comprise NVMe commands of an NVMe storage access protocol, for example, as described in the NVMe Specification, Revision 2.0a, July 2021, which is incorporated by reference herein. Other examples of NVMe storage access protocols that may be utilized in illustrative embodiments disclosed herein include NVMe over Fabrics, also referred to herein as NVMe/oF, and NVMe over TCP, also referred to herein as NVMe/TCP. Other embodiments can utilize other types of storage access protocols. As another example, communications between the host devices 101 and the storage nodes 105 in some embodiments can comprise Small Computer System Interface (SCSI) or Internet SCSI (iSCSI) commands.

Other types of commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other types, formats and configurations of IO operations can be used in other embodiments, as that term is broadly used herein.

Some embodiments disclosed herein are configured to utilize one or more RAID arrangements to store data across the storage devices 106 in each of one or more of the storage nodes 105 of the distributed storage system 102.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage controllers 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes an array of "disks" where each such disk comprises a different physical storage device of the storage devices 106. Multiple such physical storage devices are typically utilized to store data of a given LUN or other logical storage volume in the distributed storage system. For example, data pages or other data blocks of a given LUN or other logical storage volume can be "striped" along with its corresponding parity information across multiple ones of the disks in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the disks to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the disks to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

In some embodiments, the storage nodes 105 of the distributed storage system of FIG. 1 are connected to each other in a full mesh network, and are collectively managed by a system manager. A given set of local persistent storage devices 106 on a given one of the storage nodes 105 is illustratively implemented in a disk array enclosure (DAE) or other type of storage array enclosure of that storage node. Each of the storage nodes 105 illustratively comprises a central processing unit (CPU) or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system 100 as shown further comprises a plurality of system management nodes 110 that are illustratively configured to provide system management functionality of the type noted above. Such functionality in the present embodiment illustratively further involves utilization of control plane servers 112 and a system management database 116. In some embodiments, at least portions of the system management nodes 110 and their associated control plane servers 112 are distributed over the storage nodes 105. For example, a designated subset of the storage nodes 105 can each be configured to include a corresponding one of the control plane servers 112. Other system management functionality provided by system management nodes 110 can be similarly distributed over a subset of the storage nodes 105.

The system management database 116 stores configuration and operation information of the system 100 and portions thereof are illustratively accessible to various system administrators such as host administrators and storage administrators.

The manner in which the host devices 101 of system 100 are configured to obtain address range distribution information and perform associated path selection will now be described in more detail.

The host devices 101-1, 101-2, . . . 101-N include respective instances of path selection logic 114-1, 114-2, . . . 114-N. Such instances of path selection logic 114 are illustratively utilized in obtaining address range distribution information from the storage nodes 105 of the distributed storage system 102 and performing associated path selection for delivery of IO operations to the storage nodes 105. For example, in some embodiments, the instances of path selection logic 114 incorporate or are otherwise associated with instances of range processing logic that are configured to generate commands for delivery to the storage nodes 105 and to process responses to those commands as received from the storage nodes 105 in order to obtain the address range distribution information that is utilized in performing path selection.

In some embodiments, each of a plurality of LUNs or other logical storage volumes is stored across multiple ones of the storage nodes 105 of the distributed storage system 102. Accordingly, different portions of each of the logical storage volumes are illustratively stored locally at different ones of the storage nodes 105. Such local storage may be, for example, internal to the storage node or in local storage devices attached to or otherwise locally accessible to the storage node.

The different portions of a logical storage volume stored in different ones of the storage nodes 105 may comprise, for example, different extents or other arrangements of one or more logical blocks of the logical storage volume. Such portions are also referred to herein as corresponding to respective distinct logical address ranges, each such range illustratively comprising a range of logical block addresses (LBAs) of the logical storage volume.

The portion of the logical storage volume may be more particularly specified as a range of LBAs, illustratively identified by the starting LBA, also referred to as an offset, and possibly a length of the portion as measured from the starting LBA, or an ending LBA of the range. Such a range of logical addresses in some embodiments comprises an extent of the logical storage volume. As indicated previously, the different portions of the logical storage volume that are stored in different ones of the storage nodes 105 can comprise other arrangements of one or more logical blocks. Also, other types and arrangements of address ranges can be used in other embodiments, and terms such as "address range" and "address range distribution" as used herein are intended to be broadly construed.

A given one of the host devices 101 identifies a particular one of the logical storage volumes that is stored across multiple ones of the storage nodes 105 of the distributed storage system 102, and obtains address range distribution information for the logical storage volume from at least a subset of the storage nodes 105. The address range distribution information indicates, for each of a plurality of distinct address ranges of the logical storage volume, which of the storage nodes locally stores data for that address range. The given host device generates, from the obtained address range distribution information, a mapping of the distinct address ranges to particular ones of the storage nodes 105, and utilizes the mapping to select paths for delivery of TO operations to the storage nodes 105.

For example, the mapping in some embodiments allows the given host device via its instance of path selection logic 114 to select optimal paths that for each TO operation targeting a particular address range of the logical storage volume provides a direct path to the particular storage node that locally stores data for that address range. This advantageously avoids the need for additional network hops between the storage nodes 105 in order to access the particular address ranges targeted by the IO operations.

The mapping in some embodiments is generated at least in part in the form of a tree structure or other type of data structure. The tree structure in some embodiments comprises a root node, and one or more intermediate node levels each comprising one or more template nodes. The tree structure further comprises a plurality of leaf nodes for each of at least a subset of the template nodes, with the leaf nodes that are associated with a given one of the template nodes corresponding to respective sub-ranges of a range of addresses of the given template node. Each such sub-range covering a distinct portion of the logical storage volume has a size specified by a mapping granularity. A more detailed example of such a tree structure will be described below with reference to FIG. 3B.

The given host device illustratively obtains the address range distribution information for the logical storage volume from at least a subset of the storage nodes 105 by sending at least one command to each of one or more of the storage nodes 105 to obtain from those storage nodes at least one of asymmetric range access (ARA) information and template information for the logical storage volume. Such commands in some embodiments illustratively comprise one or more log page commands, although other types of commands can additionally or alternatively be used in other embodiments.

It should be noted that the given host device can obtain the address range distribution information from all, some or just one of the storage nodes 105, depending upon the particular implementation. For example, it is possible in some embodiments that each of one or more of the storage nodes 105 can provide the given host device with address range distribution information for one or more other ones of the storage nodes 105, and possibly for the entire logical storage volume.

It is possible that the address range distribution information obtained by the given host device may become inaccurate, for example, due to additional or removal of one or more storage nodes 105 from the distributed storage system 102, and/or other changes in the distribution of data across the storage nodes 105. In such situations, the given host device may send an IO operation to the "wrong" storage node, that is, a storage node that does not locally store the particular data targeted by the IO operation. However, it is assumed that the distributed storage system 102 will always process such IO operations, even though such processing may lead to non-optimal performance for those IO operations. The given host device can eventually obtain updated address range distribution information from one or more of the storage nodes 105 in order to ensure that it can select paths to those storage nodes that locally store the targeted data. The trigger for the given host device requesting updated address range distribution information can comprise, for example, an Asynchronous Event Notification (AEN) sent by at least one of the storage nodes 105 of the distributed storage system 102, a scheduled update, detection of reduced performance, and/or other specified criteria.

In some embodiments, obtaining address range distribution information for the logical storage volume from at least a subset of the storage nodes further comprises sending a first command of a first type to obtain the ARA information and a second command of a second type different than the first type to obtain the template information. For example, first and second different log page commands can used as the respective first and second commands to obtain the respective ARA and template information.

The ARA information illustratively comprises, for each of a plurality of address ranges of the logical storage volume, an address range size, a template identifier and an access modifier. A more detailed example of such ARA information, illustratively obtained via a corresponding log page command, will be described below in conjunction with FIG. 3C.

The template information illustratively comprises a template identifier and a resolution function that is executed to determine one or more optimal paths for each of a plurality of address ranges of the logical storage volume. The resolution function illustratively utilizes a modulus value to encode repetition patterns in a distribution of address ranges of the logical storage volume across the storage nodes 105. Additionally or alternatively, the resolution function in some embodiments specifies one or more additional templates for use in determining the one or more optimal paths for each of a plurality of address ranges of the logical storage volume, and/or specifies one or more additional functions for use in determining the one or more optimal paths for each of a plurality of address ranges of the logical storage volume. A more detailed example of such template information, illustratively obtained via a corresponding log page command, will be described below in conjunction with FIG. 3D.

In some embodiments, the given host device is configured to send at least a subset of the above-noted first and second commands to obtain the respective ARA information and template information to each of one or more of the storage nodes 105 at particular times based at least in part on one or more specified criteria.

For example, the commands may be sent by the given host device based at least in part on a predetermined repeating schedule.

Additionally or alternatively, the commands may be sent based at least in part on access frequencies for respective ones of the portions of the logical storage volume. In such an embodiment, one or more "hot" portions of the logical storage volume that are more frequently accessed by the given host device have their commands sent to the storage nodes at a higher rate than one or more "cold" portions of the logical storage volume that are less frequently accessed by the given host device.

The given host device can maintain access statistics for different portions of the logical storage volume, and adapt the rates at which it sends commands for those portions based at least in part on their respective different access frequencies reflected in the access statistics. For example, in some embodiments, one or more of the commands are sent for each of one or more of the portions having an access frequency at or above a specified threshold, and no commands are sent for each of one or more of the portions having an access frequency below the specified threshold. Other arrangements of different rates can be used for sending the commands for the different portions of the logical storage volume, based at least in part on their respective access frequencies.

The commands are illustratively configured in accordance with a designated storage access protocol, such as an NVMe storage access protocol or a SCSI storage access protocol. For example, at least a subset of the commands can comprise respective vendor unique or VU commands of the designated storage access protocol, although additional or alternative commands can be used.

The above-noted mapping can be for all of the portions of the logical storage volume, or for only a subset of the different portions having access frequencies above the threshold. In some embodiments, an entry of the mapping for a given one of the portions includes an identifier of the particular storage node that stores the given portion. Other types of indications of particular ones of the storage nodes associated with particular distinct address ranges can be used. The mapping can be in the form of one or more tables or other types of data structures, and is illustratively stored in a memory of the given host device.

The given host device above is an example of what is more generally referred to herein as "at least one processing device" that includes a processor coupled to a memory.

In some embodiments, IO operations are processed in the host devices 101 utilizing their respective instances of path selection logic 114 in the following manner. A given one of the host devices 101 establishes a plurality of paths between at least one initiator of the given host device and a plurality of targets of respective storage nodes 105 of the distributed storage system 102. Accordingly, the given host device illustratively comprises a plurality of initiators and supports one or more paths between each of the initiators and one or more targets on respective ones of the storage nodes 105.

For each of a plurality of IO operations targeting the logical storage volume, the given host device determines a particular one of the distinct address ranges to which the IO operation is directed, utilizes the particular distinct address range to identify from the mapping a corresponding one of the storage nodes 105, selects a path to the identified storage node, and sends the IO operation to the identified storage node over the selected path. Other types of path selection utilizing the mapping generated from the obtained address range distribution information can be used in other embodiments.

It is to be appreciated that obtaining address range distribution information and performing associated path selection as disclosed herein can be performed independently by each of the host devices 101, illustratively utilizing their respective instances of path selection logic 114, as indicated above, with possible involvement of additional or alternative system components, such as range processing logic. Such logic instances can be implemented within or otherwise in association with one or more multi-path drivers of the host devices 101.

In some embodiments, the initiator of the given host device and the targets of the respective storage nodes 105 are configured to support a designated standard storage access protocol, such as an NVMe storage access protocol or a SCSI storage access protocol. As more particular examples in the NVMe context, the designated storage access protocol may comprise an NVMe/oF or NVMe/TCP storage access protocol, although a wide variety of additional or alternative storage access protocols can be used in other embodiments.

As mentioned above, the distributed storage system 102 in some embodiments comprises a software-defined storage system and the storage nodes 105 comprise respective software-defined storage server nodes of the software-defined storage system. An example such a software-defined storage system will be described in more detail below in conjunction with the illustrative embodiment of FIG. 3A.

In some embodiments, the given host device is configured to select paths for delivery of IO operations to the storage nodes 105 based at least in part on the above-noted mapping, in a manner that ensures that the IO operations are directly delivered to the particular storage nodes 105 that locally store the corresponding targeted portions of the logical storage volume. Different mappings or other types and arrangements of address range distribution information are illustratively stored by the given host device for different LUNs or other logical storage volumes that are accessed by the given host device.

The host devices 101 can comprise additional or alternative components. For example, in some embodiments, the host devices 101 further comprise respective sets of IO queues and respective multi-path input-output (MPIO) drivers. The MPIO drivers collectively comprise a multi-path layer of the host devices 101. Path selection functionality for delivery of IO operations from the host devices 101 to the distributed storage system 102 is provided in the multi-path layer by respective instances of path selection logic 114 associated with the MPIO drivers. In some embodiments, the instances of path selection logic 114 are implemented at least in part within the MPIO drivers of the host devices 101.

The MPIO drivers may comprise, for example, otherwise conventional MPIO drivers, such as PowerPath® drivers from Dell Technologies, suitably modified in the manner disclosed herein to provide functionality for obtaining address range distribution information and performing associated path selection. Other types of MPIO drivers from other driver vendors may be suitably modified to incorporate functionality for obtaining address range distribution information and performing associated path selection as disclosed herein.

It should also be noted that the instances of path selection logic 114 can be implemented in whole or in part elsewhere in the host devices 101, and therefore need not be implemented in respective MPIO drivers. The use of MPIO drivers and/or an associated multi-path layer in some embodiments is therefore presented by way of illustrative example only, and should not be construed as limiting in any way.

In some embodiments, the instances of path selection logic 114 include or are otherwise associated with range processing logic that is configured to send commands and to receive respective responses thereto from the storage nodes 105, in the manner previously described. These and other aspects of functionality for obtaining address range distribution information and performing associated path selection are illustratively implemented within the MPIO drivers of respective host devices 101.

The range processing logic can additionally or alternatively generate a mapping based at least in part on the obtained address range distribution information, and utilize the mapping to identify a particular one of the storage nodes 105 that locally stores data of a particular portion of a logical storage volume targeted by a given IO operation.

Such range processing logic can be part of an MPIO layer of the host devices 101, or can be implemented elsewhere within the host devices 101.

In some embodiments, the host devices 101 comprise respective local caches, implemented using respective memories of those host devices. A given such local cache can be implemented using one or more cache cards. A wide variety of different caching techniques can be used in other embodiments, as will be appreciated by those skilled in the art. Other examples of memories of the respective host devices 101 that may be utilized to provide local caches include one or more memory cards or other memory devices, such as, for example, an NVMe over PCIe cache card, a local flash drive or other type of NVM storage drive, or combinations of these and other host memory devices.

The MPIO drivers are illustratively configured to deliver IO operations selected from their respective sets of IO queues to the distributed storage system 102 via selected ones of multiple paths over the network 104, with the paths being selected based at least in part on a mapping generated from obtained address range distribution information.

The sources of the IO operations stored in the sets of IO queues illustratively include respective processes of one or more applications executing on the host devices 101. For example, IO operations can be generated by each of multiple processes of a database application running on one or more of the host devices 101. Such processes issue IO operations for delivery to the distributed storage system 102 over the network 104. Other types of sources of IO operations may be present in a given implementation of system 100.

A given IO operation is therefore illustratively generated by a process of an application running on a given one of the host devices 101, and is queued in one of the IO queues of the given host device with other operations generated by other processes of that application, and possibly other processes of other applications.

The paths from the given host device to the distributed storage system 102 illustratively comprise paths associated with respective initiator-target pairs, with each initiator comprising a host bus adaptor (HBA) or other initiating entity of the given host device and each target comprising a port or other targeted entity corresponding to one or more of the storage devices 106 of the distributed storage system 102. As noted above, the storage devices 106 illustratively comprise LUNs or other types of logical storage devices, including logical storage devices also referred to herein as logical storage volumes.

In some embodiments, the paths are associated with respective communication links between the given host device and the distributed storage system 102 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used. In some embodiments, the NPIV feature of FC allows a single host HBA port to expose multiple World Wide Numbers (WWNs) or other types of identifiers to the network 104 and the distributed storage system 102.

Accordingly, in some embodiments, multiple virtual initiators are associated with a single HBA of a given one of the host devices 101 but have respective unique identifiers associated therewith.

Additionally or alternatively, different ones of the multiple virtual initiators are illustratively associated with respective different ones of a plurality of virtual machines of the given host device that share a single HBA of the given host device, or a plurality of logical partitions of the given host device that share a single HBA of the given host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various scheduling algorithms, load balancing algorithms and/or other types of algorithms can be utilized by the MPIO driver of the given host device in delivering IO operations from the IO queues of that host device to the distributed storage system 102 over particular paths via the network 104. Each such IO operation is assumed to comprise one or more commands for instructing the distributed storage system 102 to perform particular types of storage-related functions such as reading data from or writing data to particular logical volumes of the distributed storage system 102. Such commands are assumed to have various payload sizes associated therewith, and the payload associated with a given command is referred to herein as its "command payload."

A command directed by the given host device to the distributed storage system 102 is considered an "outstanding" command until such time as its execution is completed in the viewpoint of the given host device, at which time it is considered a "completed" command. The commands illustratively comprise respective NVMe commands or SCSI commands, although other command formats can be used in other embodiments. In the NVMe context, a given such command is illustratively defined by a command buffer or similar format construct. In the SCSI context, a given such command is illustratively defined by a corresponding command descriptor block (CDB) or similar format construct, and the given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the given host device and that the targets of the plurality of initiator-target pairs comprise respective ports of the distributed storage system 102. Examples of such HBAs and storage array ports are illustrated in conjunction with the embodiment of FIG. 4. A wide variety of other types and arrangements of initiators and targets can be used in other embodiments.

Selecting a particular one of multiple available paths for delivery of a selected one of the IO operations from the given host device is more generally referred to herein as "path selection." Path selection as that term is broadly used herein can in some cases involve both selection of a particular IO operation and selection of one of multiple possible paths for accessing a corresponding logical device of the distributed storage system 102. The corresponding logical device illustratively comprises a LUN or other logical storage volume to which the particular IO operation is directed.

It should be noted that paths may be added or deleted between the host devices 101 and the distributed storage system 102 in the system 100. For example, the addition of one or more new paths from the given host device to the distributed storage system 102 or the deletion of one or more existing paths from the given host device to the distributed storage system 102 may result from respective addition or deletion of at least a portion of the storage devices 106 of the distributed storage system 102.

In some embodiments, it is assumed that each of the host devices 101 has established one or more paths to each of the storage nodes 105. In the event of changes to the distributed storage system 102, such as changes in number and configuration of storage nodes 105 and/or the distribution of data across the storage nodes 105, the host devices 101 can obtain updated data distribution information, and configure additional paths as needed so as to ensure that each host device has at least one path to each of the storage nodes 105.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery may be performed as needed in order to discover the addition of new paths or the deletion of existing paths.

For example, the discovery protocol of NVMe/oF can be used in illustrative embodiments to perform path discovery.

In other embodiments, a path discovery scan can be performed utilizing known functionality of conventional MPIO drivers, such as PowerPath® drivers.

It should be noted that these and other references to MPIO herein are presented for purposes of illustration only, and use of MPIO functionality should not be viewed as a requirement of any particular embodiment. For example, instances of path selection logic 114 can be implemented elsewhere in the respective host devices 101, and therefore need not be implemented in MPIO drivers of those host devices. Such MPIO drivers can be eliminated in other illustrative embodiments.

As indicated previously, the storage nodes 105 of the distributed storage system 102 process IO operations from one or more host devices 101 and in processing those IO operations run various storage application processes that generally involve interaction of that storage node with one or more other ones of the storage nodes.

In the FIG. 1 embodiment, the distributed storage system 102 comprises storage controllers 108 and corresponding sets of storage devices 106, and may include additional or alternative components, such as sets of local caches.

The storage controllers 108 illustratively control the processing of IO operations received in the distributed storage system 102 from the host devices 101. For example, the storage controllers 108 illustratively manage the processing of read and write commands directed by the MPIO drivers of the host devices 101 to particular ones of the storage devices 106. The storage controllers 108 can be implemented as respective storage processors, directors or other storage system components configured to control storage system operations relating to processing of IO operations. In some embodiments, each of the storage controllers 108 has a different one of the above-noted local caches associated therewith, although numerous alternative arrangements are possible.

An additional example of an illustrative process for implementing at least some of the above-described functionality for obtaining address range distribution information and performing associated path selection will be provided below in conjunction with the flow diagram of FIG. 2.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

As another example, the storage nodes 105 in some embodiments are part of a distributed content addressable storage system in which logical addresses of data pages are mapped to physical addresses of the data pages in the storage devices 106 using respective hash digests, hash handles or other content-based signatures that are generated from those data pages using a secure hashing algorithm. A wide variety of other types of distributed storage systems can be used in other embodiments.

Also, the term "logical storage volume" as used herein is intended to be broadly construed, and should not be viewed as being limited to any particular format or configuration.

In some embodiments, the storage nodes 105 are implemented using processing modules that are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in the full mesh network, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using well-known communication protocols such as TCP/IP and RDMA. For example, respective sets of IP links used in data transfer and corresponding messaging could be associated with respective different ones of the routing modules.

The particular features described above in conjunction with FIG. 1 should not be construed as limiting in any way, and a wide variety of other system arrangements for obtaining address range distribution information and performing associated path selection on respective host devices for facilitating efficient delivery of IO operations to storage nodes of a distributed storage system are possible.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated host devices 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the host devices 101 and the storage nodes 105 to reside in different data centers. Numerous other distributed implementations of the storage nodes 105 and their respective associated sets of host devices 101 are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, distributed storage system 102, storage nodes 105, storage devices 106, storage controllers 108, system management nodes 110 and instances of path selection logic 114 can be used in other embodiments. For example, as mentioned previously, system management functionality of system management nodes 110 can be distributed across a subset of the storage nodes 105, instead of being implemented on separate nodes.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in some embodiments, certain portions of the functionality for obtaining address range distribution information and performing associated path selection as disclosed herein are implemented through cooperative interaction of one or more host devices and storage nodes of a distributed storage system. Accordingly, such functionality can be distributed over multiple distinct processing devices. The term "at least one processing device" as used herein is therefore intended to be broadly construed.

The operation of the information processing system 100 will now be described in further detail with reference to the flow diagram of the illustrative embodiment of FIG. 2, which illustrates a process for obtaining address range distribution information and performing associated path selection utilizing path selection logic 114 of one or more of the host devices 101. This process may be viewed as an illustrative example of an algorithm implemented at least in part by a given one of the host devices 101 utilizing its corresponding instance of path selection logic 114. These and other algorithms for obtaining address range distribution information and performing associated path selection as disclosed herein can be implemented using other types and arrangements of system components in other embodiments.

The process for obtaining address range distribution information and performing associated path selection illustrated in FIG. 2 includes steps 200 through 210, and in some embodiments is assumed to be implemented primarily by a particular one of the host devices 101 utilizing its corresponding instance of path selection logic 114. Similar processes may be implemented primarily by each of the other ones of the host devices 101 utilizing their respective instances of path selection logic 114.

As mentioned previously, the instances of path selection logic 114 may be configured to include or to be otherwise associated with respective corresponding instances of range processing logic, for generating a mapping characterizing an address range distribution of a logical storage volume across the storage nodes 105.

In step 200, a given host device identifies a logical storage volume stored across multiple storage nodes of a distributed storage system. For example, the distributed storage system 102 of FIG. 1 is illustratively configured to distribute portions of each of a plurality of LUNs or other logical storage volumes across different ones of the storage nodes 105. The given host device illustratively establishes a plurality of paths between at least one initiator of the given host device and a plurality of targets of respective storage nodes of the distributed storage system. In some embodiments, the paths are established at least in part utilizing one or more MPIO drivers of the host device, although it is to be appreciated that use of MPIO drivers or a multi-path layer is not a requirement of the present disclosure. There are illustratively multiple paths between each initiator and each of one or more of the targets.

In step 202, the host device obtains address range distribution information for the logical storage volume from the storage nodes. The address range distribution information indicates, for each of multiple distinct address ranges of the volume, which storage node locally stores data for that address range. The host device obtains the address range distribution information by sending commands to the storage nodes, such as separate log page commands described elsewhere herein to obtain respective ARA information and template information from the storage nodes, although additional or alternative commands can be used to obtain the address range distribution information from the storage nodes.

In step 204, the host device generates, from the obtained address range distribution information, a mapping of the address ranges to particular ones of the storage nodes. Such a mapping illustratively allows the host device to determine, given a particular address range targeted by a corresponding IO operation, an optimal path to the storage node that locally stores data for that address range. The mapping can comprise, for example, a tree structure of the type described elsewhere herein, but may include additional or alternative data structures, in any combination. Different such mappings may be generated and stored for each of a plurality of different LUNs or other logical storage volumes accessed by the host device.

The term "optimal path" as broadly used herein is not limited to a path to the storage node that locally stores targeted data, but may alternatively include, for example, a path to another storage node that is in close proximity to the storage node that locally stores the targeted data, so as to be reachable in a minimal number of network hops. Accordingly, an optimal path may comprise, for example, any path that is more likely to exhibit a reduced number of network hops, and/or other improved metric (e.g., minimal processing, power efficiency, etc.) to access the targeted data than a path that is selected without the benefit of the obtained address range distribution information, such as a randomly-selected path or a path selected using a round robin selection technique. It is therefore to be appreciated that determination of an optimal path as disclosed herein is not limited to consideration of number of network hops, but can additionally or alternatively take other metrics into account.

In step 206, for a given IO operation targeting the volume, the host device determines a particular one of the distinct address ranges to which the IO operation is directed, and utilizes the particular distinct address range to identify from the mapping a corresponding one of the storage nodes. In some embodiments, more than one storage node may be identified from the mapping in this step. Accordingly, there may be multiple optimal paths associated with different ones of the storage nodes, as the term "optimal path" is broadly used herein. The term "mapping" as used herein is also intended to be broadly construed, so as to encompass, for example, a wide variety of different arrangements of tables or other data structures from which one or more storage nodes can be identified as being associated with optimal paths for a given address range. The given IO operation is illustratively generated by an application executing on the host device for delivery to the distributed storage system.

As indicated previously, the distributed storage system in some embodiments comprises a software-defined storage system and the storage nodes comprise respective software-defined storage server nodes of the software-defined storage system. Other types of distributed storage systems can be used in other embodiments. This identification of which storage node locally stores data for the particular distinct address range portion of the logical storage volume in some embodiments is illustratively implemented by one or more MPIO drivers of the host device. For example, the one or more MPIO drivers illustratively store the above-noted mapping and utilize it in path selection. As indicated above, a different such mapping can be generated and stored by or otherwise under the control of the one or more MPIO drivers for each of a plurality of different logical storage volumes.

In step 208, a particular one of the paths from one of the initiators of the host device to one of the targets on a particular identified storage node is selected. As indicated above, the particular identified storage node may comprise a particular one of a plurality of identified storage nodes, each associated with a different optimal path. The path selection in some embodiments makes use of path selection logic of one or more MPIO drivers of the host device, although again it is to be understood that use of MPIO drivers is not required.

In step 210, the IO operation is sent to the identified storage node of the distributed storage system over the selected path from an initiator of the host device to a target of the identified storage node.

Steps 200 through 210 are illustratively repeated for each of a plurality of additional IO operations generated by one or more applications executing on the host device. Multiple such processes may operate in parallel with one another in order to process IO operations targeting different logical storage volumes.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for obtaining address range distribution information and performing associated path selection. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another, for example, in order to implement a plurality of different processes for respective different logical storage volumes.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Host devices can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Host devices, storage controllers and other system components may be implemented at least in part using processing devices of such processing platforms. For example, respective path selection logic instances and other related logic instances of the host devices can be implemented in respective containers running on respective ones of the processing devices of a processing platform.

In some embodiments, a host device can comprise a hypervisor or an OS kernel. Numerous other host device configurations are possible. The term "host device" as used herein is therefore intended to be broadly construed.

Additional examples of illustrative embodiments will now be described with reference to FIG. 3, which collectively includes multiple figures individually denoted as FIGS. 3A, 3B, 3C and 3D. These embodiments illustrate an example of a distributed storage system that more particularly comprises a software-defined storage system having a plurality of software-defined storage server nodes, also referred to as SDS server nodes, configured to utilize an NVMe storage access protocol such as NVMe/oF or NVMe/TCP. Such SDS server nodes are examples of "storage nodes" as that term is broadly used herein. As will be appreciated by those skilled in the art, similar embodiments can be implemented without the use of software-defined storage and with other storage access protocols.

Accordingly, as indicated elsewhere herein, these and other references to software-defined storage systems are made by way of illustrative example only, and should not be viewed as limiting in any way. The disclosed techniques can be implemented in any distributed storage system comprising multiple storage nodes.

Figure 3A:
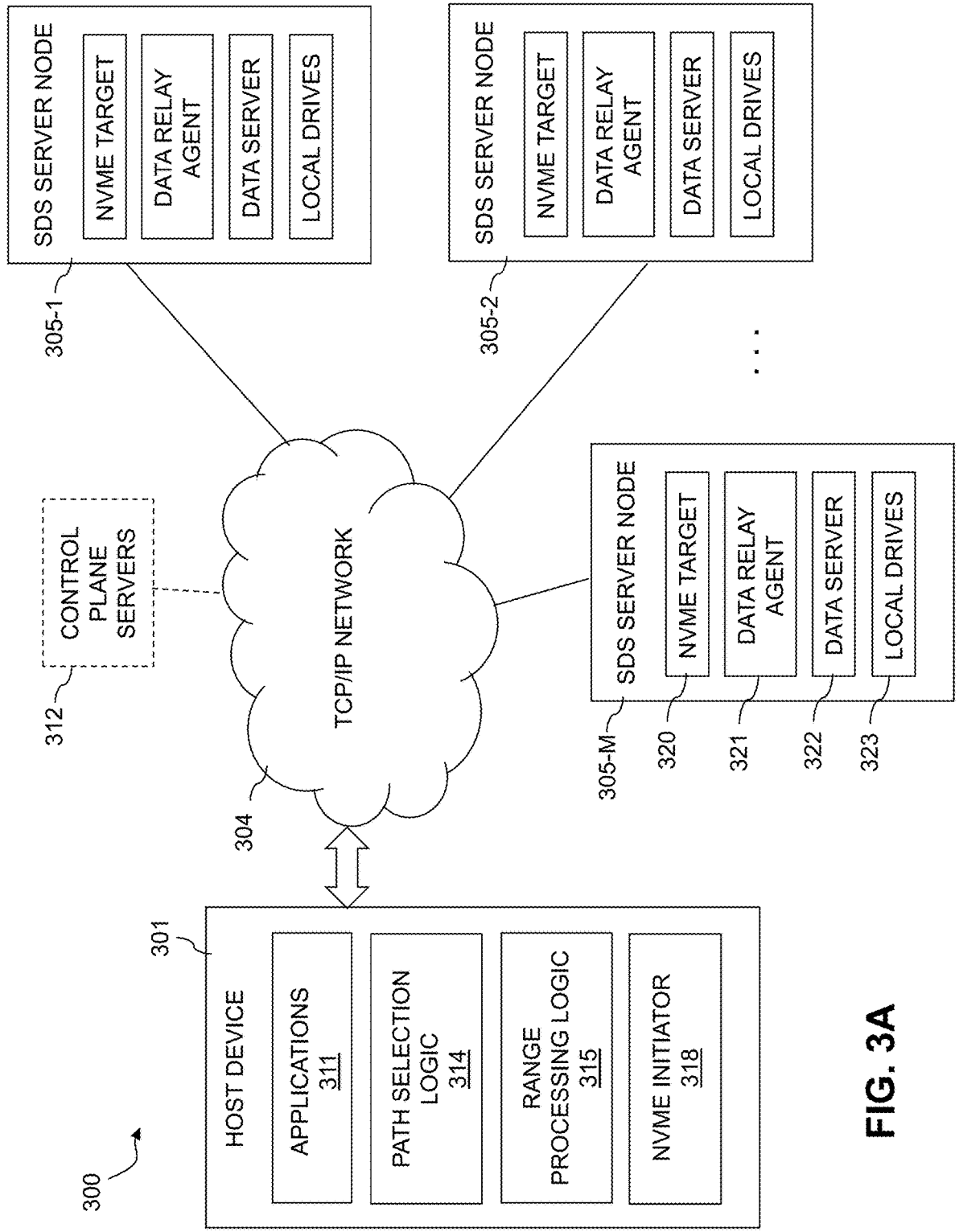
FIG. 3A shows an example of an information processing system incorporating functionality for obtaining address range distribution information and performing associated path selection for logical storage volumes of a software-defined storage system in an illustrative embodiment.

Referring initially to FIG. 3A, an information processing system 300 comprises a host device 301 configured to communicate over a network 304, illustratively a TCP/IP network, with a distributed storage system comprising a plurality of SDS server nodes 305-1, 305-2, . . . 305-M and corresponding control plane servers 312. The control plane servers 312 are shown in dashed outline as the functionality of such servers in illustrative embodiments may be distributed over a particular subset of the SDS server nodes 305 rather than being implemented on separate nodes of the distributed storage system. However, in other embodiments, the control plane servers 312 may be implemented on separate nodes. The control plane servers 312 provide system management functionality such as centralized storage provisioning, monitoring, membership management, as well as storage partitioning.

A plurality of applications 311 execute on the host device 301 and generate IO operations that are delivered to particular ones of the SDS server nodes 305 via at least one NVMe initiator 318. The host device 301 further comprises path selection logic 314 and range processing logic 315, illustratively configured to carry out functionality of the host device 301 for obtaining address range distribution information and performing associated path selection in a manner similar to that previously described. In other embodiments, the range processing logic 315 may be part of the path selection logic 314, rather than a separate component as illustrated in the figure. Both the path selection logic 314 and the range processing logic 315 in some embodiments may be implemented at least in part within an MPIO driver of the host device 301. In other embodiments, the path selection logic 314 and range processing logic 315 may be implemented at least in part elsewhere in the host device 301, such as within a given one of the applications 311 or in a related service. Although only a single host device 301 is shown in system 300, the system 300 can include multiple host devices, each configured as generally shown for host device 301, as in the system 100 of FIG. 1.

Each of the SDS server nodes 305 in the present embodiment comprises at least one NVMe target 320, a data relay agent 321, a data server 322 and a set of local drives 323. In other embodiments, the set of local drives 323 is optional for one or more of the SDS server nodes 305, or may be located external to a given one of the SDS server nodes 305. The data relay agent 321 facilitates relaying of IO requests between different ones of the SDS server nodes 305, and the data servers 322 provide access to data stored in the local drives 323 of their respective SDS server nodes 305. Additional or alternative components may be included in the SDS server nodes 305 in illustrative embodiments.

Although single NVMe initiators and targets are shown in respective ones of the host device 301 and the SDS server nodes 305, this is by way of simplified illustration only, and other embodiments can include multiple NVMe initiators within host device 301 and multiple NVMe targets within each of the SDS server nodes 305.

In some embodiments, the SDS server nodes 305 are configured at least in part as respective PowerFlex® software-defined storage nodes from Dell Technologies, suitably modified as disclosed herein to include NVMe targets 320, although other types of storage nodes can be used in other embodiments.

As mentioned previously, absent use of the techniques disclosed herein, it can be difficult in software-defined storage systems and in other types of distributed storage systems to obtain desired levels of performance, particularly when utilizing advanced storage access protocols such as NVMe/oF or NVMe/TCP.

For example, some software-defined storage systems utilize proprietary protocols to enable seamless access to data located in different storage nodes on behalf of the applications, and to hide the details of data distribution and physical storage locations from those applications, and possibly from other portions of the host device 301. In such arrangements, performance issues may arise due to non-optimal path selection.

Illustrative embodiments herein overcome these and other disadvantages of conventional practice by providing techniques for obtaining address range distribution information and performing associated path selection in a software-defined storage system or other type of distributed storage system.

This is advantageously achieved in the system 300 by configuring the host device 301 to include path selection logic 314 and range processing logic 315 so as to allow the host device 301 to direct each JO operation to the appropriate one of the SDS server nodes 305 that locally stores the targeted data in its local drives 323, thereby avoiding additional network hops between multiple SDS server nodes 305 in the processing of JO operations and ensuring low latency and high performance.

It is assumed in illustrative embodiments that a given logical storage volume of the system 300 is stored in a distributed manner across the SDS server nodes 305, with different extents or other portions of the given logical storage volume being locally stored on different ones of the SDS server nodes 305. For example, the given logical storage volume can be formed by grouping different portions of physical storage pools from different SDS server nodes 305, and zoning those different portions to the host device 301.

In the FIG. 3A embodiment, each of the SDS server nodes 305 comprises one or more NVMe targets exposing one or more logical storage volumes that include data stored locally in the local drives 323 of those SDS server nodes. When one of the applications 311 needs to access data of a logical storage volume, the host device 301 uses the path selection logic 314 and range processing logic 315 to determine the optimal NVMe targets to which the corresponding IO requests should be sent, and sends the IO requests to those NVMe targets 320 on the particular SDS server nodes 305 via the NVMe initiator 318. The NVMe target on a given one of the SDS server nodes 305 can directly process a received JO request via the data relay agent 321 and data server 322 using locally stored data on the local drives 323 without involving corresponding components on any other one of the SDS server nodes 305.

The determination of the appropriate one of the SDS server nodes 305 to which a given JO operation should be sent is made based at least in part on a mapping. This mapping is generated by the host device 301 using address range distribution information that is gathered from the SDS server nodes 305 by the host device 301 using commands of the type described elsewhere herein.

The mapping in some embodiments comprises a tree structure or additional or alternative data structures from which the path selection logic 314 can determine, for IO operations targeting particular address ranges of the logical storage volume, identifiers of respective ones of the SDS server nodes 305 that locally store data for those address ranges in their respective instances of the local drives 323.

This optimizes the initial delivery of the IO operations from the host device 301 to the appropriate corresponding ones of the SDS server nodes 305 locally storing targeted data, avoiding the extra network hop or hops that might otherwise result when a given IO operation targeting data stored locally on one of the SDS server nodes 305 is initially delivered to a different one of the SDS server nodes 305, as those SDS server nodes 305 collectively implement a unified storage pool as seen from the host device 301. As indicated previously, others type of optimal paths can be selected in other embodiments, as the term "optimal path" is broadly used herein, where optimality is broadly defined as exhibiting a reduced number of network hops to access targeted data than techniques such as random selection or round-robin selection.

Example techniques implemented in the system 300, and possibly also other systems disclosed herein such as system 100, will now be described in more detail.

In these examples, it is assumed that the host device 301 utilizes vendor unique or VU commands in accordance with an NVMe storage access protocol as the above-noted commands. Commands standardized across multiple vendors can additionally or alternatively be used. The term "vendor unique command" as used herein is intended to be broadly construed, and should not be viewed as being limited to a single vendor. As indicated elsewhere herein, a wide variety of other types of commands can be used.

These commands are utilized by the host device 301 to determine which of the SDS server nodes 305 locally store data for different address ranges of a given logical storage volume. Such address range distribution information is illustratively obtained via the above-noted commands and stored by the host device 301 in the form of a mapping from which optimal paths can be determined for respective IO operations targeting different address ranges of the logical storage volume. The obtaining of the address range distribution information and the generating of the corresponding mapping is illustratively implemented at least in part under the control of the range processing logic 315.

The address range distribution information utilized to generate the above-noted mapping is not static, as extents may be reconfigured and moved from one SDS server node to another, and so the host can periodically or under other specified conditions repeat the sending of its commands and update the mapping based on the latest replies. Other events can trigger sending of additional commands, such as various changes in configuration of the host device or the distributed storage system.

Example techniques for obtaining address range distribution information and generating a mapping therefrom in the system 300 of FIG. 3A will now be described with reference to FIGS. 3B, 3C and 3D. As will become apparent, these techniques provide highly efficient communication of address range distribution information from the SDS server nodes 305 to the host device 301, allowing the host device 301 to generate a corresponding mapping for use in path selection.

The address range distribution information in illustrative embodiments comprises ARA information and template information, which can be obtained using respective log page commands or other types of commands sent by the host device 301 to the SDS server nodes 305 as disclosed herein.

Figure 3B:
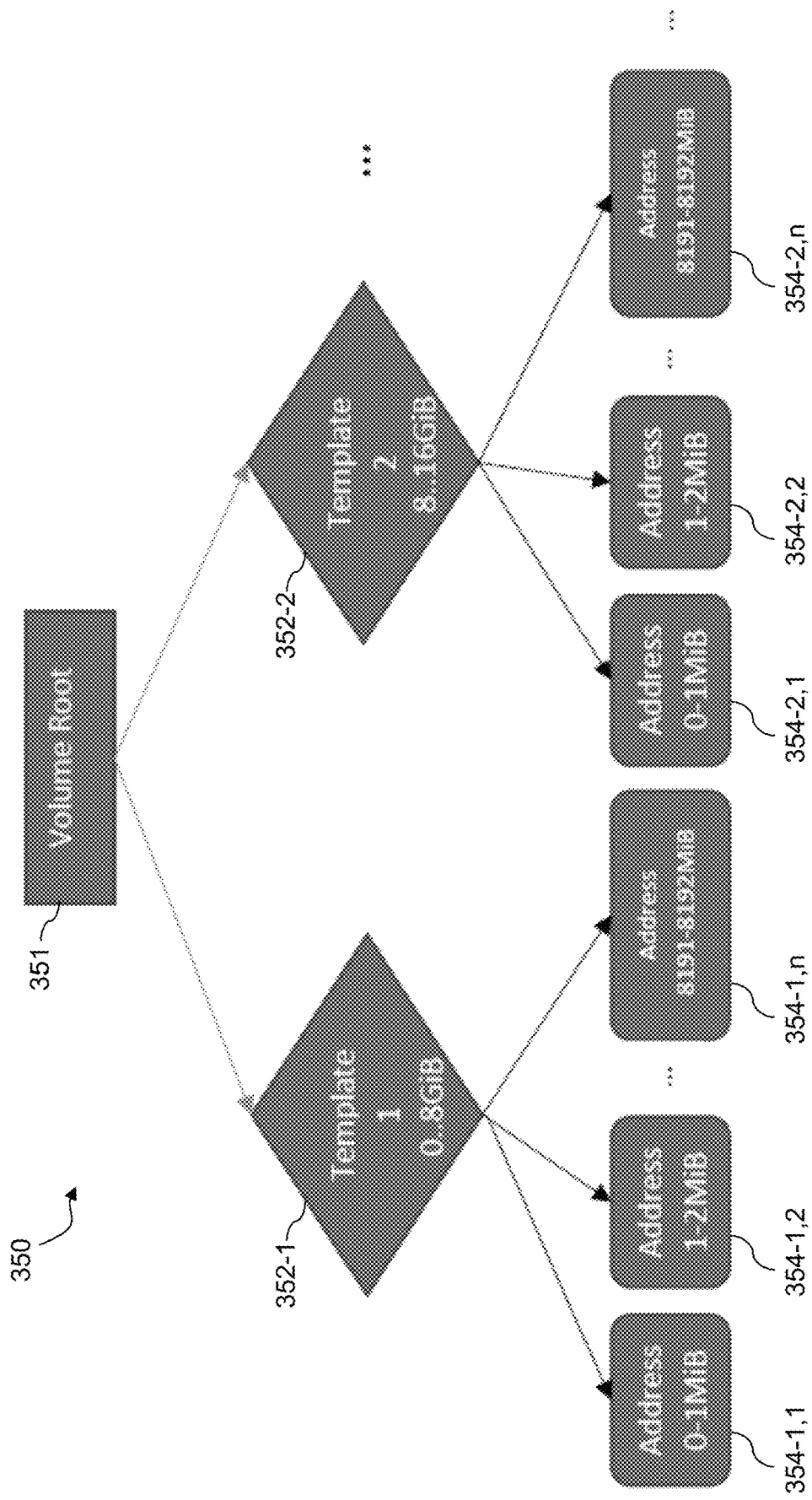
FIG. 3B shows an example tree structure of the obtained address range distribution information in such an embodiment.

FIG. 3B shows an example tree structure 350 in an illustrative embodiment. Such a tree structure can be viewed as at least a portion of what is more generally referred to herein as a "mapping" generated from obtained address range distribution information. In this example, the mapping granularity is 1 MiB, where MiB denotes a "mebibyte" or $2^{20}=1,048,576$ bytes, and GiB denotes a "gibibyte" or $2^{30}=1,073,741,824$ bytes, or 1024 MiBs. Other mapping granularities can be used in other embodiments. The mapping granularity generally indicates the common size of each of the extents or other logical blocks of the logical storage volume that are distributed across the storage nodes. Each such distributed portion of the logical storage volume corresponds to a distinct address range within that volume.

The tree structure 350 characterizes a particular volume, and comprises a volume root node 351 and a plurality of template nodes 352. The tree structure 350 divides the volume into 8 GiB templates, each corresponding to one of the template nodes 352. The template nodes 352 in this example more particularly comprise at least a first template node 352-1 and a second template node 352-2, each illustratively representing an LBA range of size 8 GiB within the volume. The first template node 352-1, also denoted in the figure as Template 1, covers the LBA range from 0 to 8 GiB, and the second template node 352-2, also denoted in the figure as Template 2, covers the LBA range from 8 GiB to 16 GiB. Additional template nodes not explicitly shown may also be part of the tree structure 350, depending upon the size of the volume, in order to build an ARA topology over the LBA range of the entire volume. Other template node arrangements are possible. For example, a given tree structure in other embodiments can include multiple levels comprising respective different sets of template nodes. Such levels are also referred to herein as "intermediate node levels" of the tree structure.

Each of the template nodes 352-1 is associated with a plurality of underlying leaf nodes 354 in the tree structure 350. More particularly, template node 352-1 is associated with a first leaf node 354-1,1 and a second leaf node 354-1,2 and so on to a final leaf node 354-1,$n$ where n denotes the number of leaf nodes 354 associated with each of the template nodes 352. Similarly, template node 352-2 is associated with a first leaf node 354-2,1 and a second leaf node 354-2,2 and so on to a final leaf node 354-2,$n$. Each of the leaf nodes 354 in this example covers an LBA range of 1 MiB. For example, the first leaf node 354-1,1 covers the LBA range from 0 to 1 MiB, the second leaf node 354-1,2 covers the LBA range from 1 MiB to 2 MiB, and so on until the final leaf node 354-1,$n$ which covers the LBA range from 8191 MiB to 8192 MiB, with similar LBA range coverage for the leaf nodes 354 of the other template nodes 352. Thus, each of the template nodes 352 in the example tree structure 350 covers a corresponding LBA range of size 8 GiB, which is equivalent to 8×1024 MiBs=8192 MiB, such that n=8192 in this example. Other types of tree structures with different numbers and arrangements of template nodes and leaf nodes can be used in other embodiments.

Each of the leaf nodes 354 in some embodiments has information associated therewith that identifies a particular corresponding one of the SDS server nodes 305 that locally stores data of the address range of that leaf node. Other arrangements providing optimal access to data of the address range can additionally or alternatively be used, as described in more detail elsewhere herein. For example, it is possible that more than one SDS server node can provide optimal access to data as determined by one or more metrics. Accordingly, in some embodiments, one or more optimal paths can be identified in the information associated with each of the leaf nodes 354. Other types of information can similarly be associated with other nodes of the tree structure 350. Also, one or more other data structures can be used in place of or in addition to the tree structure 350 in other embodiments.

The example tree structure 350 is advantageously configured to provide memory and computation efficiency. For example, the template nodes 352 allow the use of a variety of different resolution functions to determine which underlying leaf node 354 to access within the tree structure 350 for a given address range, thereby reducing the amount of host memory and computation resources required in identifying for each IO operation the particular storage node to which that IO operation should be directed.

As indicated previously, illustrative embodiments utilize the following two example log pages disclosed herein, although additional or alternative log pages can be used in other embodiments:

1. An ARA log page is provided to expose the ARA topology and related information to the host. The ARA log page is specific to a logical storage volume. This page lists all the templates used to access the volume, and the corresponding LBA ranges in the volume. Each template is identified using a unique template identifier (ID) and an access modifier. The access modifier advantageously allows for reuse of the same template to encode multiple pieces of data, even across volumes. The ARA log page also includes a header with a generation number and additional metadata about the log page.

An illustrative example of an ARA log page is described in more detail below in conjunction with FIG. 3C.

2. A template log page. Each template has a unique ID to identify it in the system, and it encodes optimal paths for a wide range of LBAs. The template allows encoding of portions of the address range distribution information in a compact manner. Each access to a template can be modified by using one or more extra parameters, so as to allow several distinct volumes, or different address ranges in the same volume, to use the same template for encoding access to different parts of the volume.

In some embodiments, each template implements a resolution function, illustratively of the following form:

$f$:(offset,modifier)→{OptimalPath1, OptimalPath2, . . . }.

Different techniques can be used to encode the address range distribution information efficiently within the templates by using different resolution functions. Such encoding techniques include but are not limited to the following:

(a) Using a modulus function to encode pattern repetitions. An access modifier can be used to encode a constant addition to the offset.

(b) Using templates that transform the arguments and refer to other templates for further resolution. For example, such transformative templates are illustratively of the form:

$f$:(offset,modifier)→(templateID,offset,modifier).

These transformative templates allow for the encoding of complex distribution patterns, and can include, for example, dividing the template range into smaller ranges (e.g., linear division) and/or using a hash function to transform the access address. A combination of these techniques can be used for example to encode persistent hashing.

(c) Encoding a programmatic function for resolution by sending code to be executed. Such executable code can be communicated in an eBPF bytecode format, which is already used for trusted execution in Linux kernels, although it is to be appreciated that other code formats can be used.

An illustrative example of a template log page is described in more detail below in conjunction with FIG. 3D.

The host device 301 illustratively obtains the above-described ARA log page and template log page from one or more of the SDS server nodes 305 by sending respective corresponding log page commands to the one or more SDS server nodes 305 to obtain the log pages. Such log page commands in some embodiments comprise respective vendor unique or VU commands of the NVMe storage access protocol.

It should be noted that use of log pages and associated log page commands as described above is by way of illustrative example only, and other arrangements involving other types of NVMe commands can be used. For example, the above-described information provided via the template log page can additionally or alternatively be provided using other types of NVMe commands, such as, for example, an NVMe identify command.

In some embodiments, the basic configuration of the tree structure 350 remains relatively constant throughout the lifetime of the volume, although changes in the address range distribution across the SDS server nodes 305 may change the corresponding leaf nodes, thus also changing the template encoding.

These and other changes can be notified to the host device 301 by one or more of the SDS server nodes 305 using an NVMe Asynchronous Event Notification (AEN) or other suitable indicator. Such AENs or other indicators illustratively trigger the host device 301 to obtain updated AER information and template information from one or more of the SDS server nodes 305, and to update its mapping accordingly.

Additional examples will now be described with reference to the illustrative embodiments of FIGS. 3C and 3D. It is assumed for these examples that the volume comprises a 16 GiB volume, with the full LBA range of the volume being encoded using the tree structure 350 of FIG. 3B, but with just two template nodes, 352-1 and 352-2, each having n=8192 leaf nodes 354 covering respective different 1 MiB portions of the full LBA range of the volume. The mapping granularity is therefore again 1 MiB in these examples.

In some embodiments, it is assumed that an identify namespace object for the volume will include fields to advertise support for the ARA log page, as well as information on the 1 MiB mapping granularity.

FIG. 3C shows the information provided by an ARA log page for the 16 GiB volume in an illustrative embodiment. The LBA ranges are listed consecutively in ascending order, and illustratively include first and second LBA ranges denoted Range #1 and Range #2, respectively, corresponding to respective ones of the first and second templates.

Each such LBA range in this example has a size given by a power of two specified in the ARA log page, and more particularly a value of 33, where $2^{33}=8$ GiB is the size of the LBA range, as previously described for the first and second template nodes 352-1 and 352-2 of FIG. 3B. The first and second templates are more particularly identified in the ARA log page by their respective template IDs 0x0A and 0x0B, and have associated access modifiers as indicated. The access modifiers for templates 0x0A and 0x0B in this example are 1 and 0, respectively, although other types of access modifies can be used.

FIG. 3D shows the information provided by a template log page in an illustrative embodiment. The information in this embodiment comprises a template generic header, including information such as template size, template type and resolution type (e.g., path or template), and a modulus encoding header, comprising a modulus data granularity (which in this embodiment is greater than or equal to the mapping granularity) and a modulus value (e.g., denoting a repetition pattern). The provided information in this embodiment further comprises, for each of a plurality of access ranges 0, 1, 2 and 3, a corresponding number of optimal paths in the range, and one or more identifiers of the one or more optimal paths.

The template information in this example more particularly refers to three storage nodes, denoted as nodes 1, 2 and 3, and three distinct paths, denoted as a path to node 1, a path to node 2, and a path to node 3.

The repetition pattern is 4 MiB, and given the modulus data granularity of 1 MiB, the pattern repeats after 4 MiB, thereby supporting the four access ranges 0, 1, 2 and 3 as shown in the figure. The first three access ranges 0, 1 and 2 have respective single optimal paths indicated as the path to node 1, the path to node 2 and the path to node 3, respectively. The fourth access range has two optimal paths, namely, the path to node 1 and the path to node 3. This pattern repeats for respective additional sets of four access ranges.

Assume by way of example that the host device 301 needs to access data starting at an offset of 22 MiB into the volume.

The host device 301 first determines the correct template, which in this case is template 0x0A that is associated with the lower 8 GiB portion of the 16 GiB volume. Then the host device resolves the address range from the template, in this case by disregarding the lowest 20 bits of the address, and the higher bits above bit 22, and using the remaining bits to determine a particular one of a plurality of access ranges specified by the template. The access modifier for template 0x0A is 1 and denotes a constant that is added, with the result of the resolution indicating access range 3. The host device 301 therefore selects either the path to storage node 1 or the path to node 3, as specified for access range 3 in the template information of FIG. 3D.

As mentioned previously, ARA information and template information of the type illustrated in FIGS. 3C and 3D, respectively, is utilized by the host device 301 to generate a mapping that illustratively includes tree structure 350. Such mapping generation in some embodiments is performed by an MPIO driver of the host device 301. The MPIO driver in such an arrangement illustratively comprises the path selection logic 314 and the range processing logic 315. The MPIO driver then performs target resolution utilizing the mapping in order to determine which of the SDS server nodes 305 locally stores the targeted data for each IO operation directed to the volume, such that an optimal path to that storage node, or another identified storage node, can be selected by the path selection logic 314. This illustratively involves, for a given IO operation, traversing the tree structure 350, from its volume root node 351 through one or more template nodes 352 to a particular one of the leaf nodes 354, until a resolution is reached for the particular LBA range of the IO operation. As the tree structure 350 is relatively static and updates will generally tend to be infrequent, resolution results can be cached for different LBA ranges in order to further improve system performance.

Although MPIO drivers are utilized in some embodiments herein to obtain address range distribution information and to perform associated path selection, other arrangements are possible. For example, the path selection logic 314 and range processing logic 315 in some embodiments are implemented at least in part in one or more data processing units (DPUs) of the host device 301 in order to offload at least portions of its NVMe-related functionality from CPUs and other processing resources of the host device 301. Numerous alternative processing device arrangements are possible.

As indicated previously, in some embodiments, the mapping generated by the host device 301 only covers "hot" portions of the volume, in order to reduce the memory footprint at the cost of less than ideal access to the "cold" portions of the volume. The default access for such cold portions is assumed to be normal access, with the path selection being performed without the benefit of address range distribution information, as opposed to the optimized access utilized for the hot portions.

These and other features of illustrative embodiments disclosed herein are examples only, and should not be construed as limiting in any way. Other types of address range distribution information and associated path selection can be used in other embodiments, and such terms as used herein are therefore intended to be broadly construed.

Referring now to FIG. 4, another illustrative embodiment is shown. In this embodiment, an information processing system 400 comprises host-side elements that include application processes 411, path selection logic 414 and range processing logic 415, and storage-side elements that include IO processing logic 421 and range data structures 422. The path selection logic 414 is configured to utilize a stored mapping generated under the control of range processing logic 415 to facilitate path selection in the manner disclosed herein, by ensuring that IO operations can be directed to the appropriate storage nodes of a distributed storage system comprising one or more storage arrays. There may be separate instances of one or more such elements associated with each of a plurality of system components such as host devices and storage arrays of the system 400. For example, different instances of the path selection logic 414 are illustratively implemented within or otherwise in association with respective ones of a plurality of MPIO drivers of respective host devices.

The system 400 is configured in accordance with a layered system architecture that illustratively includes a host device processor layer 430, an MPIO layer 432, an HBA layer 434, a switch fabric layer 436, a storage array port layer 438 and a storage array processor layer 440. The host device processor layer 430, the MPIO layer 432 and the HBA layer 434 are associated with one or more host devices, the switch fabric layer 436 is associated with one or more SANs or other types of networks, and the storage array port layer 438 and storage array processor layer 440 are associated with one or more storage arrays ("SAs"). A given such storage array illustratively comprises a software-defined storage system or other type of distributed storage system comprising a plurality of storage nodes.

In a manner similar to that described elsewhere herein, a given one of the host devices of the system 400 in the present embodiment is configured to identify a logical storage volume stored across multiple storage nodes of a distributed storage system, and to obtain address range distribution information for the logical storage volume from at least a subset of the storage nodes, where the address range distribution information indicates, for each of a plurality of distinct address ranges of the logical storage volume, which of the storage nodes locally stores data for that address range. The given host device generates, from the obtained address range distribution information, a mapping of the distinct address ranges to particular ones of the storage nodes. The mapping is utilized by the given host device to select paths for delivery of IO operations to the storage nodes. The obtaining of the address range distribution information from the storage nodes and the generation of the mapping from that obtained information is illustratively implemented at least in part by or under the control of the range processing logic 415.

For each of a plurality of IO operations generated by one or more of the application processes 411 in the given host device for delivery to one or more of the storage arrays, the given host device accesses the mapping to determine a particular one of the storage nodes that stores data for a particular extent or other logical storage volume portion that is targeted by the IO operation. The given host device then selects, illustratively via one or more MPIO drivers of the MPIO layer 432, a particular one of the plurality of paths from an initiator of the host device to one of the targets on the particular storage node, and sends the IO operation to the particular storage node over the selected path.

The system 400 in this embodiment therefore implements techniques for obtaining address range distribution information and performing associated path selection utilizing one or more MPIO drivers of the MPIO layer 432, and corresponding instances of path selection logic 414 and the range processing logic 415.

The application processes 411 generate IO operations that are processed by the MPIO layer 432 for delivery to the one or more storage arrays that collectively comprise a plurality of storage nodes of a distributed storage system. Paths are determined by the path selection logic 414 for sending such IO operations to the one or more storage arrays, based at least in part on one or more stored mappings or other types of data structures generated at least in part by or under the control of the range processing logic 415, in the manner described above. These IO operations are sent by a given host device to particular ones of the storage nodes via optimal paths selected by the path selection logic 414.

The above-noted mapping as well as additional or alternative data structures are generated by the given host device using address range distribution information obtained from one or more storage nodes of a distributed storage system. The distributed storage system illustrative maintains such address range distribution information in one or more of the range data structures 422 that are part of the storage array processors layer 440 of system 400.

The MPIO layer 432 is an example of what is also referred to herein as a multi-path layer, and comprises one or more MPIO drivers implemented in respective host devices. Each such MPIO driver illustratively comprises respective instances of path selection logic 414 and range processing logic 415 configured as previously described. Additional or alternative layers and logic arrangements can be used in other embodiments.

The IO processing logic 421 implemented in the storage array processor layer 440 controls the processing of read requests, write requests and other commands received from the MPIO drivers of the one or more host devices. The IO processing logic 421 is also illustratively configured to respond to log page commands or other types of commands received from the host devices with ARA information and template information, or other types of address range distribution information, as disclosed herein.

In the system 400, path selection logic 414 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 4 embodiment can illustratively have a set of n paths to a shared storage array, or alternatively different ones of the host devices can have different numbers and types of paths to the storage array.

The path selection logic 414 of the MPIO layer 432 in this embodiment selects paths for delivery of IO operations to the one or more storage arrays having the storage array ports of the storage array port layer 438. More particularly, the path selection logic 414 determines appropriate paths over which to send particular IO operations to particular logical storage devices of the one or more storage arrays, based at least in part on a mapping generated in a corresponding host device in the manner described above.

It is assumed in this embodiment that the host devices through their respective MPIO drivers and respective instances of path selection logic 414 and range processing logic 415 implement functionality for obtaining address range distribution information and performing associated path selection, illustratively with involvement of other system components including at least the HBAs of the HBA layer 434. For example, the path selection logic 414 illustratively utilizes a mapping generated from address range distribution information at least in part by or under the control of range processing logic 415 to determine a particular storage node to which a given IO operation is to be directed, and selects a path to that particular storage node based at least in part on the determination. Other host device entities can similarly utilize the path selection logic 414 and range processing logic 415 to identify for each of a plurality of IO operations the particular corresponding storage nodes that store the targeted data, in a manner that ensures that the paths selected by the path selection logic are paths to the appropriate storage nodes, thereby improving system performance.

These and other embodiments disclosed herein provide significant advantages over conventional approaches.

For example, illustrative embodiments provide techniques for obtaining address range distribution information and performing associated path selection, implemented by a host device and/or other system components configured to interact with storage nodes of a distributed storage system over one or more networks.

Some embodiments advantageously facilitate the usage of advanced storage access protocols such as NVMe/oF or NVMe/TCP in software-defined storage systems and other types of distributed storage systems.

Moreover, these embodiments can ensure low latency and high performance, for example, by avoiding additional network "hops" between multiple storage nodes in the processing of IO operations.

Some embodiments allow a distributed storage system to provide internal address range distribution information for one or more logical storage volumes to host devices, utilizing log page commands or other arrangements consistent with existing NVMe standards or other storage access protocol standards.

For example, the combination of ARA log pages and template log pages utilized in illustrative embodiments allows highly efficient encoding of various aspects of the address range distribution information, thereby facilitating its communication from the storage system to the host devices. These and other techniques disclosed herein can readily scale to accommodate large volume capacities.

Host devices can utilize such address range distribution information to generate mappings that ensure optimal path selection for IO operations. Such embodiments can exhibit significantly improved performance relative to conventional arrangements that do not take address range distribution information into account in selecting paths for delivery of IO operations to storage nodes of a distributed storage system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and distributed storage systems with functionality for obtaining address range distribution information and performing associated path selection will now be described in greater detail with reference to FIGS. 5 and 6. Although described in the context of system 100, these platforms may also be used to implement at least portions of other information processing systems in other embodiments.

Figure 5:
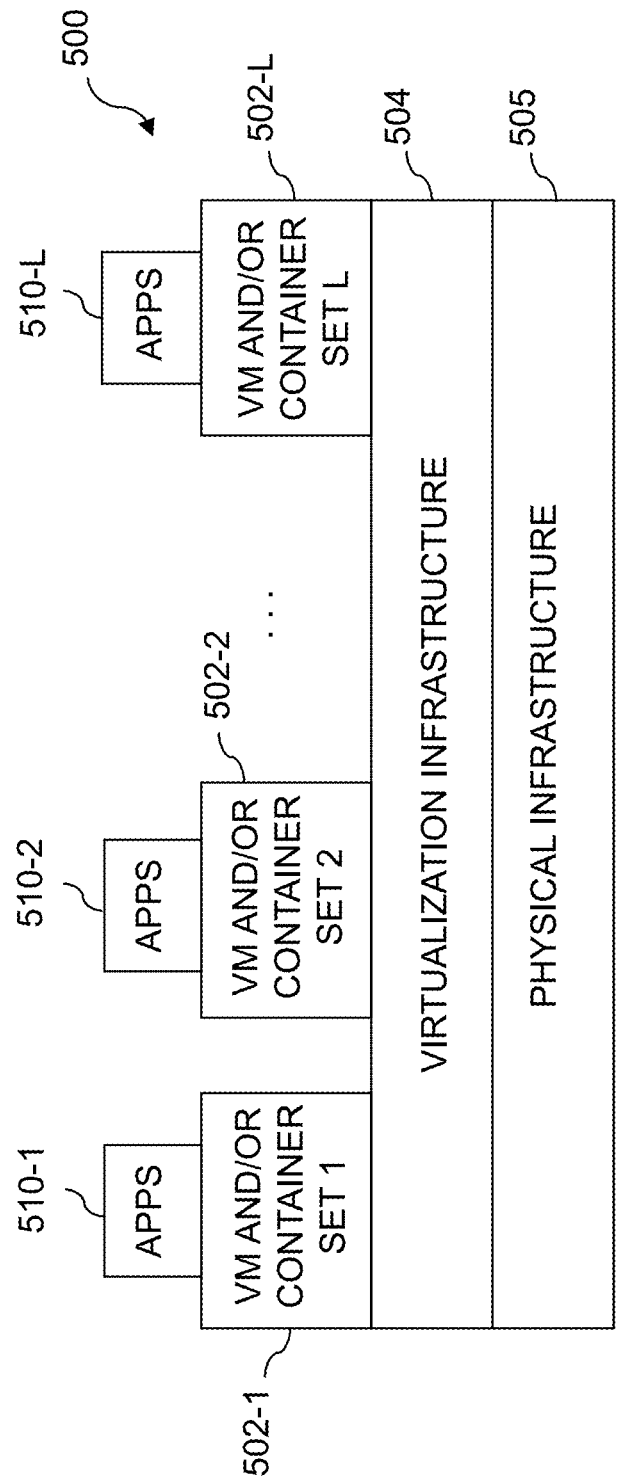
FIGS. 5 and 6 show examples of processing platforms that may be utilized to implement at least a portion of an information processing system in illustrative embodiments.
Figure 6:
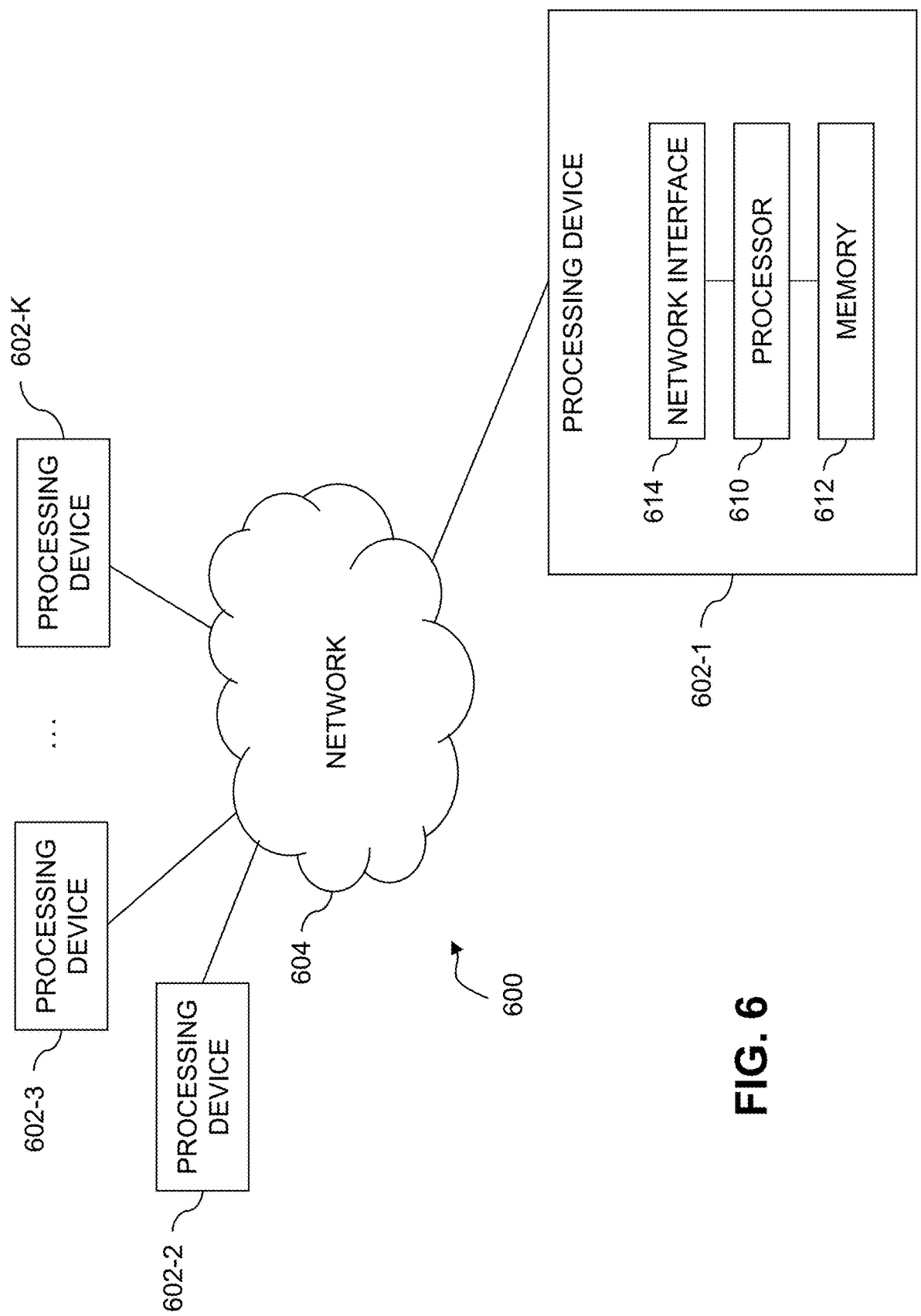

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide functionality for obtaining address range distribution information and performing associated path selection in a host device of the type described above using one or more processes running on a given one of the VMs. For example, each of the VMs can implement logic instances and/or other components for implementing functionality associated with obtaining address range distribution information and performing associated path selection in one or more of the host devices 101 of the system 100.

A hypervisor platform may be used to implement a hypervisor within the virtualization infrastructure 504. Such a hypervisor platform may comprise an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide functionality for obtaining address range distribution information and performing associated path selection in a host device of the type described above. For example, a container host device supporting multiple containers of one or more container sets can implement logic instances and/or other components for implementing functionality associated with obtaining address range distribution information and performing associated path selection in one or more of the host devices 101 of the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a CPU, a DPU, a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for obtaining address range distribution information and performing associated path selection as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, initiators, targets, path selection logic instances and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to identify a logical storage volume stored across multiple storage nodes of a distributed storage system;
   to obtain address range distribution information for the logical storage volume from at least a subset of the storage nodes, wherein the address range distribution information indicates, for each of a plurality of distinct address ranges of the logical storage volume, which of the storage nodes locally stores data for that address range; and
   to generate, from the obtained address range distribution information, a mapping of the distinct address ranges to particular ones of the storage nodes;
   wherein obtaining address range distribution information for the logical storage volume from at least a subset of the storage nodes comprises sending at least one command to a given one of the storage nodes to obtain from the given storage node at least one of asymmetric range access information and template information for the logical storage volume; and
   wherein the mapping is utilized to select paths for delivery of input-output operations to the storage nodes.

2. The apparatus of claim 1 wherein the at least one processing device comprises at least a portion of a host device which communicates with the distributed storage system over one or more networks.

3. The apparatus of claim 2 wherein the host device comprises a plurality of initiators and supports one or more paths between each of the initiators and one or more targets on respective ones of the storage nodes.

4. The apparatus of claim 1 wherein the distributed storage system comprises a software-defined storage system and the storage nodes comprise respective software-defined storage server nodes of the software-defined storage system.

5. The apparatus of claim 1 wherein the at least one processing device is further configured, for each of a plurality of input-output operations targeting the logical storage volume:

to determine a particular one of the distinct address ranges to which the input-output operation is directed;

to utilize the particular distinct address range to identify from the mapping a corresponding one of the storage nodes;

to select a path to the identified storage node; and to send the input-output operation to the identified storage node over the selected path.

6. The apparatus of claim 1 wherein the at least one processing device comprises a host device that includes at least one multi-path driver configured to obtain the address range distribution information for the logical storage volume from at least a subset of the storage nodes and to generate the mapping from the obtained address range distribution information.

7. The apparatus of claim 1 wherein obtaining address range distribution information for the logical storage volume from at least a subset of the storage nodes further comprises sending a first command of a first type to obtain the asymmetric range access information and a second command of a second type different than the first type to obtain the template information.

8. The apparatus of claim 1 wherein the asymmetric range access information comprises, for each of a plurality of address ranges of the logical storage volume, an address range size, a template identifier and an access modifier.

9. The apparatus of claim 1 wherein the template information comprises a template identifier and a resolution function that is executed to determine one or more optimal paths for each of a plurality of address ranges of the logical storage volume.

10. The apparatus of claim 9 wherein the resolution function utilizes a modulus value to encode repetition patterns in a distribution of address ranges of the logical storage volume across the storage nodes.

11. The apparatus of claim 9 wherein the resolution function specifies one or more additional templates for use in determining the one or more optimal paths for each of a plurality of address ranges of the logical storage volume.

12. The apparatus of claim 9 wherein the resolution function specifies one or more additional functions for use in determining the one or more optimal paths for each of a plurality of address ranges of the logical storage volume.

13. The apparatus of claim 1 wherein generating, from the obtained address range distribution information, a mapping of the distinct address ranges to particular ones of the storage nodes comprises generating a tree structure comprising a root node, one or more intermediate node levels each comprising one or more template nodes, and a leaf node level comprising a plurality of leaf nodes for each of at least a subset of the template nodes, the leaf nodes associated with a given one of the template nodes corresponding to respective sub-ranges of a range of addresses of the given template node, each such sub-range covering a distinct portion of the logical storage volume having a size specified by a mapping granularity.

14. A computer program product comprising a non-transitory processor-readable storage medium having stored therein program code of one or more software programs, wherein the program code when executed by at least one processing device comprising a processor coupled to a memory, causes the at least one processing device:

to identify a logical storage volume stored across multiple storage nodes of a distributed storage system;

to obtain address range distribution information for the logical storage volume from at least a subset of the storage nodes, wherein the address range distribution information indicates, for each of a plurality of distinct address ranges of the logical storage volume, which of the storage nodes locally stores data for that address range; and to generate, from the obtained address range distribution information, a mapping of the distinct address ranges to particular ones of the storage nodes;

wherein obtaining address range distribution information for the logical storage volume from at least a subset of the storage nodes comprises sending at least one command to a given one of the storage nodes to obtain from the given storage node at least one of asymmetric range access information and template information for the logical storage volume; and wherein the mapping is utilized to select paths for delivery of input-output operations to the storage nodes.

15. The computer program product of claim 14 wherein obtaining address range distribution information for the logical storage volume from at least a subset of the storage nodes further comprises sending a first command of a first type to obtain the asymmetric range access information and a second command of a second type different than the first type to obtain the template information.

16. A method comprising:

identifying a logical storage volume stored across multiple storage nodes of a distributed storage system;

obtaining address range distribution information for the logical storage volume from at least a subset of the storage nodes, wherein the address range distribution information indicates, for each of a plurality of distinct address ranges of the logical storage volume, which of the storage nodes locally stores data for that address range; and generating, from the obtained address range distribution information, a mapping of the distinct address ranges to particular ones of the storage nodes;

wherein obtaining address range distribution information for the logical storage volume from at least a subset of the storage nodes comprises sending at least one command to a given one of the storage nodes to obtain from the given storage node at least one of asymmetric range access information and template information for the logical storage volume;

wherein the mapping is utilized to select paths for delivery of input-output operations to the storage nodes; and wherein the method is performed by at least one processing device comprising a processor coupled to a memory.

17. The method of claim 16 wherein obtaining address range distribution information for the logical storage volume from at least a subset of the storage nodes further comprises sending a first command of a first type to obtain the asymmetric range access information and a second command of a second type different than the first type to obtain the template information.

18. The method of claim 16 wherein the asymmetric range access information comprises, for each of a plurality of address ranges of the logical storage volume, an address range size, a template identifier and an access modifier.

19. The method of claim 16 wherein the template information comprises a template identifier and a resolution function that is executed to determine one or more optimal paths for each of a plurality of address ranges of the logical storage volume.

20. The method of claim 19 wherein the resolution function utilizes a modulus value to encode repetition patterns in a distribution of address ranges of the logical storage volume across the storage nodes.

* * * * *